US012640897B2

(12) United States Patent
Zhou et al.

(10) Patent No.: US 12,640,897 B2
(45) Date of Patent: May 26, 2026

(54) TIME WINDOW BASED SIDELINK FULL-DUPLEX

(71) Applicant: QUALCOMM Incorporated, San Diego, CA (US)

(72) Inventors: Yan Zhou, San Diego, CA (US); Hemant Saggar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 18/458,042

(22) Filed: Aug. 29, 2023

(65) Prior Publication Data

US 2025/0080312 A1 Mar. 6, 2025

(51) Int. Cl.
*H04L 5/14* (2006.01)
*H04W 72/1263* (2023.01)
*H04W 72/25* (2023.01)

(52) U.S. Cl.
CPC ........... *H04L 5/14* (2013.01); *H04W 72/1263* (2013.01); *H04W 72/25* (2023.01)

(58) Field of Classification Search
CPC .... H04L 5/14; H04W 72/1263; H04W 72/25; H04W 72/046; H04W 72/23; H04B 7/0695; H04B 7/088
See application file for complete search history.

(56) References Cited

U.S. PATENT DOCUMENTS

| | | | | |
|---|---|---|---|---|
| 2021/0385056 A1* | 12/2021 | Zhou | ................... | H04B 7/0695 |
| 2022/0030612 A1* | 1/2022 | Balasubramanian | ...................... | |
| | | | | H04L 5/0053 |
| 2023/0050681 A1 | 2/2023 | Zhou et al. | | |

FOREIGN PATENT DOCUMENTS

WO WO-2022174386 A1 * 8/2022 ........... H04B 7/0632

OTHER PUBLICATIONS

International Search Report and Written Opinion—PCT/US2024/041472—ISA/EPO—Oct. 31, 2024 (2307842WO).

* cited by examiner

*Primary Examiner* — Rina C Pancholi
(74) *Attorney, Agent, or Firm* — Holland & Hart LLP

(57) ABSTRACT

Methods, systems, and devices for wireless communications are described. User equipments (UEs) that operate in side-link mode 2 may be configured with or agree upon time windows in which full-duplex communication is supported and time windows in which half-duplex communication is supported. The UEs may agree upon beam pair links to be used for full-duplex communication during the full-duplex time windows. A first UE may transmit sidelink control information (SCI) that schedules a first sidelink shared channel communication in a first communication resource in a time window that is configured for full-duplex communi-cation. Based on the SCI, a second UE may identify that the first sidelink shared channel communication is scheduled in the first communication resource in a full-duplex time window and may transmit a second sidelink shared channel communication to the first UE in a second communication resource that at least partially overlaps with the first com-munication resource.

30 Claims, 13 Drawing Sheets

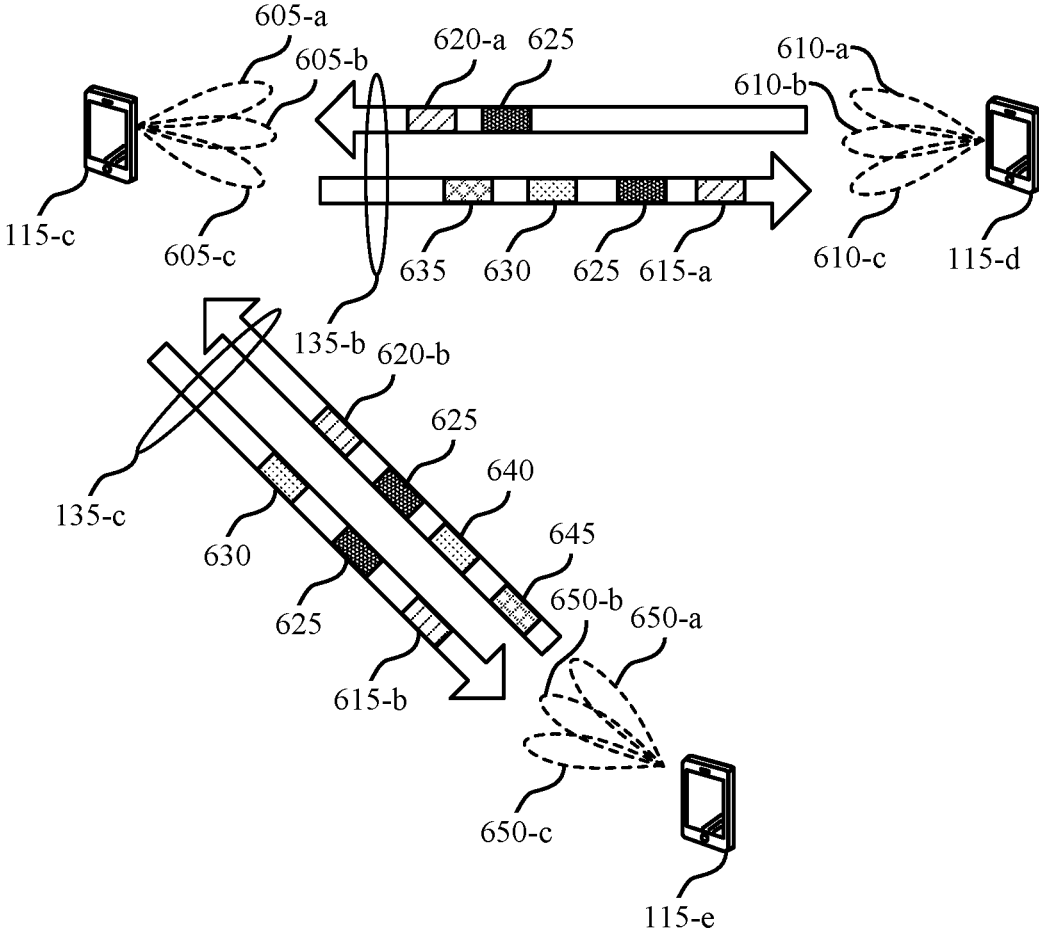
FIG. 6

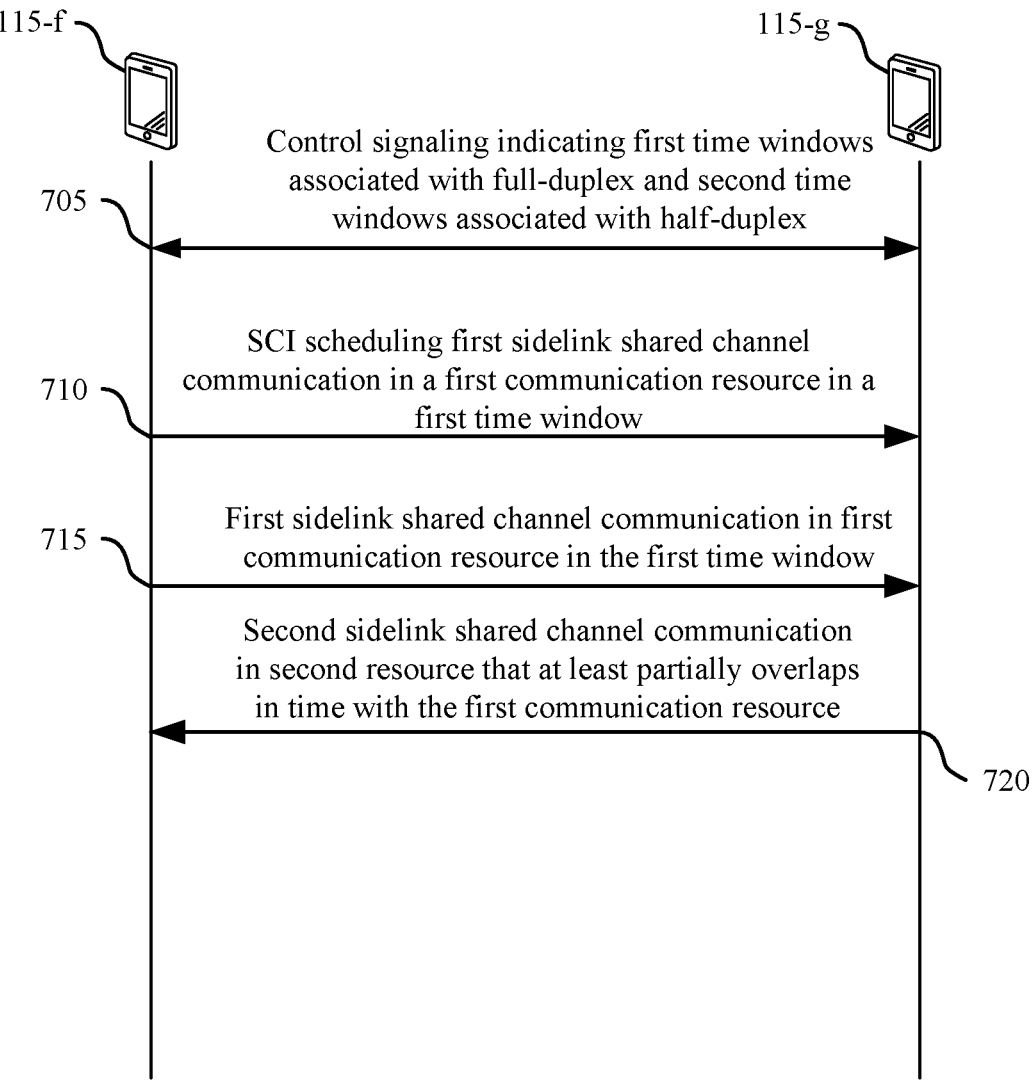

115-f 115-g

705 — Control signaling indicating first time windows associated with full-duplex and second time windows associated with half-duplex 710 — SCI scheduling first sidelink shared channel communication in a first communication resource in a first time window 715 — First sidelink shared channel communication in first communication resource in the first time window Second sidelink shared channel communication in second resource that at least partially overlaps in time with the first communication resource

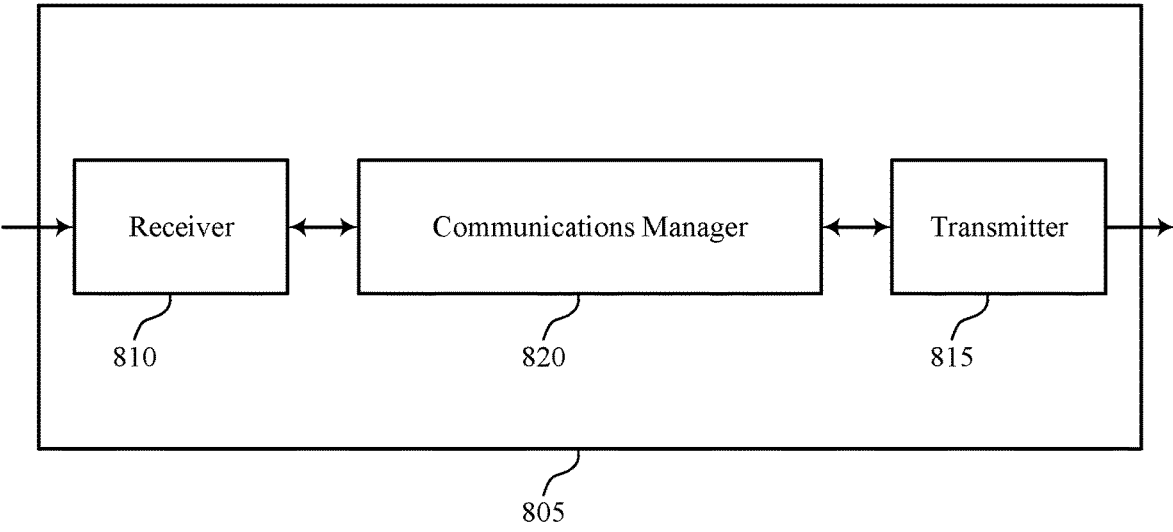
FIG. 8

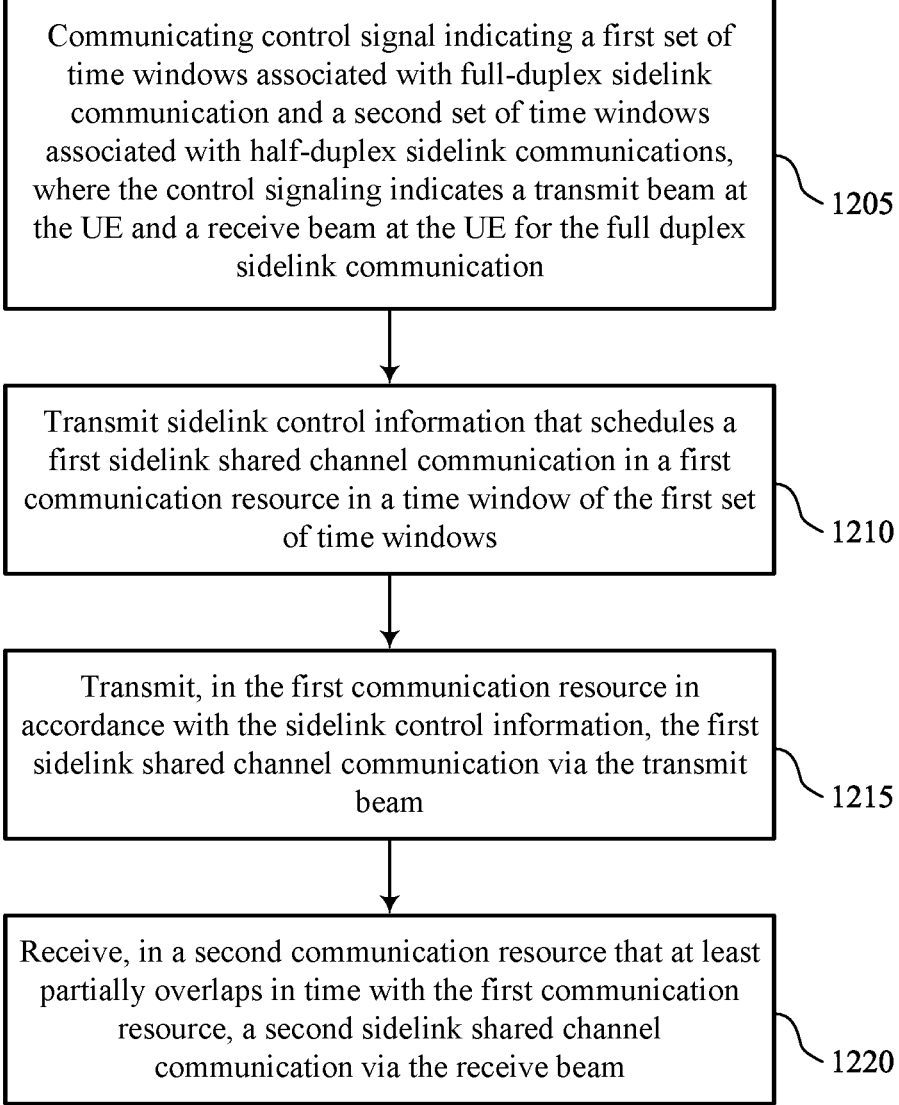

Communicating control signal indicating a first set of time windows associated with full-duplex sidelink communication and a second set of time windows associated with half-duplex sidelink communications, where the control signaling indicates a transmit beam at the UE and a receive beam at the UE for the full duplex sidelink communication

1205

Transmit sidelink control information that schedules a first sidelink shared channel communication in a first communication resource in a time window of the first set of time windows

1210

Transmit, in the first communication resource in accordance with the sidelink control information, the first sidelink shared channel communication via the transmit beam

1215

Receive, in a second communication resource that at least partially overlaps in time with the first communication resource, a second sidelink shared channel communication via the receive beam

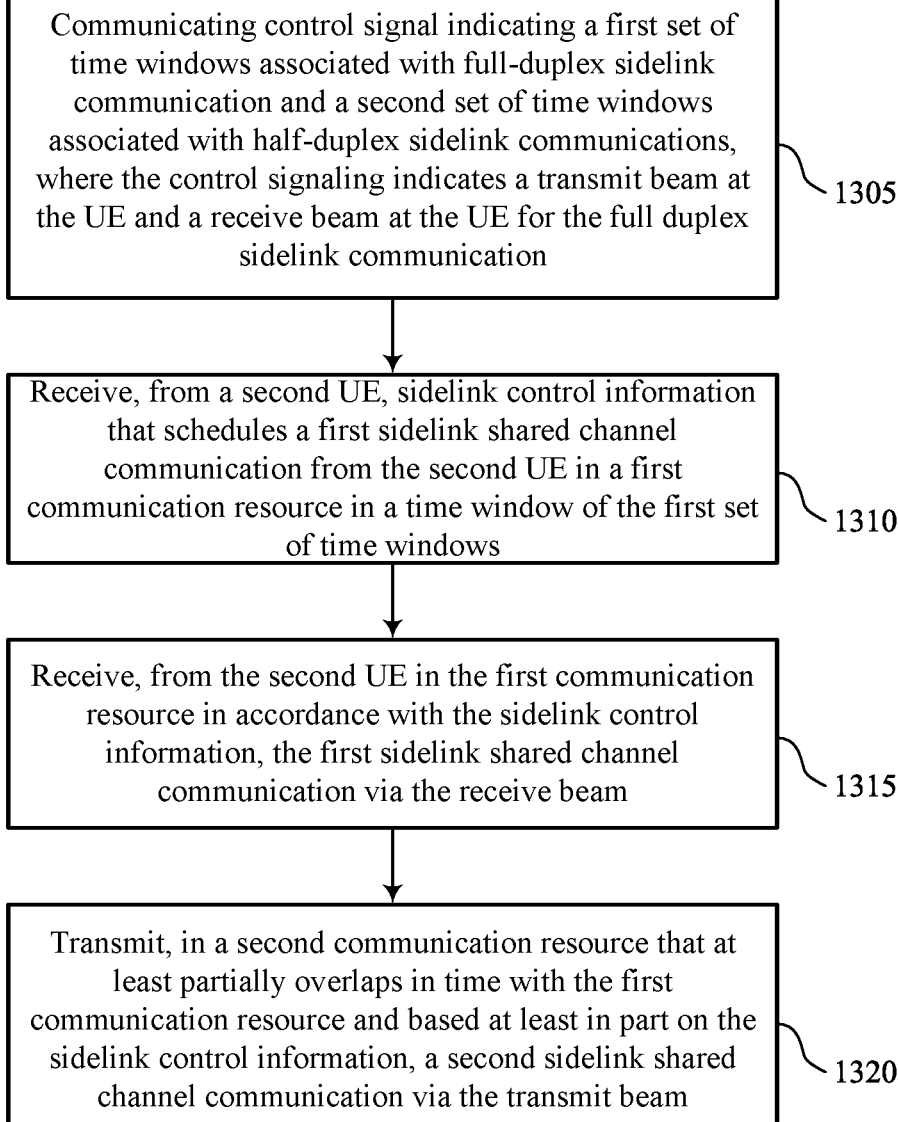

Communicating control signal indicating a first set of time windows associated with full-duplex sidelink communication and a second set of time windows associated with half-duplex sidelink communications, where the control signaling indicates a transmit beam at the UE and a receive beam at the UE for the full duplex sidelink communication

1305

Receive, from a second UE, sidelink control information that schedules a first sidelink shared channel communication from the second UE in a first communication resource in a time window of the first set of time windows

1310

Receive, from the second UE in the first communication resource in accordance with the sidelink control information, the first sidelink shared channel communication via the receive beam

1315

Transmit, in a second communication resource that at least partially overlaps in time with the first communication resource and based at least in part on the sidelink control information, a second sidelink shared channel communication via the transmit beam

TIME WINDOW BASED SIDELINK FULL-DUPLEX

TECHNICAL FIELD

The following relates to wireless communications, including time window based sidelink full-duplex.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support time window based sidelink full-duplex. For example, the described techniques provide for full-duplex communication in sidelink using indicated or agreed upon sidelink transmission parameters. User equipments (UEs) that operate in sidelink mode 2 may be configured with (e.g., by the network) or may agree upon time windows in which full-duplex communication is supported and time windows in which half-duplex communication is supported. The UEs may agree upon beam pair links (BPLs) to be used for full-duplex communication during the full-duplex time windows. A first UE may transmit sidelink control information (SCI) that schedules a first sidelink shared channel communication in a first communication resource in a time window that is configured for full-duplex communication at the first UE. For transmission of the first sidelink shared channel communication, the first UE may use the first BPL indicated for full-duplex transmission at the first UE. Based on the SCI, a second UE may identify that the first sidelink shared channel communication is scheduled in the first communication resource in a full-duplex time window and may transmit a second sidelink shared channel communication to the first UE in a second communication resource that at least partially overlaps with the first communication resource in the time domain. The second UE may use the BPL indicated for full-duplex reception at the first UE. The second UE may either be the UE scheduled to receive the first sidelink shared channel communication or another UE.

A method for wireless communications by a UE is described. The method may include communicating control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication, transmitting SCI that schedules a first sidelink shared channel communication in a first communication resource in a time window of the first set of time windows, transmitting, in the first communication resource in accordance with the SCI, the first sidelink shared channel communication via the transmit beam, and receiving, in a second communication resource that at least partially overlaps in time with the first communication resource, a second sidelink shared channel communication via the receive beam.

An apparatus for wireless communications at a UE is described. The apparatus may include at least one processor, memory coupled (e.g., operatively, communicatively, functionally, electronically, or electrically) with the at least one processor, and instructions stored in the memory. The instructions may be executable by the at least one processor (e.g., directly, indirectly, after pre-processing, without pre-processing) to cause the apparatus to communicate control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication, transmit SCI that schedules a first sidelink shared channel communication in a first communication resource in a time window of the first set of time windows, transmit, in the first communication resource in accordance with the SCI, the first sidelink shared channel communication via the transmit beam, and receive, in a second communication resource that at least partially overlaps in time with the first communication resource, a second sidelink shared channel communication via the receive beam.

Another UE for wireless communications is described. The UE may include means for communicating control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication, means for transmitting SCI that schedules a first sidelink shared channel communication in a first communication resource in a time window of the first set of time windows, means for transmitting, in the first communication resource in accordance with the SCI, the first sidelink shared channel communication via the transmit beam, and means for receiving, in a second communication resource that at least partially overlaps in time with the first communication resource, a second sidelink shared channel communication via the receive beam.

A non-transitory computer-readable medium storing code for wireless communications at a UE is described. The code may include instructions executable by at least one processor (e.g., directly, indirectly, after pre-processing, without pre-processing) to communicate control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication, transmit SCI that schedules a first sidelink shared channel communication in a first communication resource in a time window of the first set of time windows, transmit, in the first communication resource in accordance with the SCI, the first sidelink shared channel communication via the transmit beam, and receive, in a second communication resource that at least partially overlaps in time with the first communication resource, a second sidelink shared channel communication via the receive beam.

In some examples of the method, UEs, and non-transitory computer-readable medium described herein, the first sidelink shared channel communication may be transmitted to a second UE and the second sidelink shared channel communication may be received from the second UE.

In some examples of the method, UEs, and non-transitory computer-readable medium described herein, communicating the control signaling may include operations, features, means, or instructions for communicating an indication of a first BPL for communications from the UE to the second UE and a second BPL for communications from the second UE to the UE, where the first BPL includes the transmit beam and the second BPL includes the receive beam.

Some examples of the method, UEs, and non-transitory computer-readable medium described herein may further include operations, features, means, or instructions for identifying a first set of BPLs that support half-duplex sidelink communication between the UE and the second UE, transmitting, to the second UE, a first message indicating a second set of BPLs identified by the UE that can support the full-duplex sidelink communication between the UE and the second UE, where the second set of BPLs may be identified based on the first set of BPLs, and receiving, from the second UE, a second message indicating a third set of BPLs identified by the second UE that can support the full-duplex sidelink communication between the UE and the second UE, where the first BPL and the second BPL may be both included the second set of BPLs and the third set of BPLs.

In some examples of the method, UEs, and non-transitory computer-readable medium described herein, the second sidelink shared channel communication may be received from a second UE and the first sidelink shared channel communication may be transmitted to a third UE.

In some examples of the method, UEs, and non-transitory computer-readable medium described herein, communicating the control signaling may include operations, features, means, or instructions for communicating an indication of a set of transmission parameters associated with the full-duplex sidelink communication in the first set of time windows, the set of transmission parameters including at least one of a transmission power, a transmission timing, a modulation and coding scheme (MCS), a rank, a precoding matrix, or a target reference signal receive power (RSRP), where the first sidelink shared channel communication may be transmitted in accordance with the set of transmission parameters.

Some examples of the method, UEs, and non-transitory computer-readable medium described herein may further include operations, features, means, or instructions for transmitting a second SCI that schedules a third sidelink shared channel communication in a third communication resource in a second time window of the first set of time windows, where the SCI indicates that the third sidelink shared channel communication may be a half-duplex communication, and where the control signaling indicates a second set of transmission parameters associated with half-duplex sidelink communication in the first set of time windows and transmitting, in the third communication resource in accordance with the second set of transmission parameters, the third sidelink shared channel communication via the transmit beam.

Some examples of the method, UEs, and non-transitory computer-readable medium described herein may further include operations, features, means, or instructions for receiving a second SCI that schedules the second sidelink shared channel communication, where the second SCI may be responsive to the SCI.

In some examples of the method, UEs, and non-transitory computer-readable medium described herein, communicating the control signaling may include operations, features, means, or instructions for receiving the control signaling from a network entity.

In some examples of the method, UEs, and non-transitory computer-readable medium described herein, communicating the control signaling may include operations, features, means, or instructions for transmitting the control signaling to a second UE, where at least one of the first sidelink shared channel communication may be transmitted to the second UE or the second sidelink shared channel communication may be received from the second UE.

In some examples of the method, UEs, and non-transitory computer-readable medium described herein, communicating the control signaling may include operations, features, means, or instructions for receiving the control signaling from a second UE, where at least one of the first sidelink shared channel communication may be transmitted to the second UE or the second sidelink shared channel communication may be received from the second UE.

In some examples of the method, UEs, and non-transitory computer-readable medium described herein, the first communication resource at least partially overlaps in frequency with the second communication resource.

In some examples of the method, UEs, and non-transitory computer-readable medium described herein, the first communication resource includes a first set of frequency resources and the second communication resource includes a second set of frequency resources and the first set of frequency resources may be separated in frequency from the second set of frequency resources.

In some examples of the method, UEs, and non-transitory computer-readable medium described herein, the control signaling indicates the transmit beam at the UE via indicating a first transmission configuration indicator (TCI) state and the control signaling indicates the receive beam at the UE via indicating a second TCI state.

A method for wireless communications by a first UE is described. The method may include communicating control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication, receiving, from a second UE, SCI that schedules a first sidelink shared channel communication from the second UE in a first communication resource in a time window of the first set of time windows, receiving, from the second UE in the first communication resource in accordance with the SCI, the first sidelink shared channel communication via the receive beam, and transmitting, in a second communication resource that at least partially overlaps in time with the first communication resource and based on the SCI, a second sidelink shared channel communication via the transmit beam.

An apparatus for wireless communications at a first UE is described. The apparatus may include at least one processor, memory coupled (e.g., operatively, communicatively, functionally, electronically, or electrically) with the at least one processor, and instructions stored in the memory. The instructions may be executable by the at least one processor (e.g., directly, indirectly, after pre-processing, without pre-processing) to cause the apparatus to communicate control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication, receive, from a second UE, SCI that schedules a first sidelink shared channel communication from the second UE in a first communication resource in a time window of the first set of time windows, receive, from the second UE in the first communication resource in accordance with the SCI, the first sidelink shared channel communication via the receive beam, and transmit, in a second communication resource that at least partially overlaps in time with the first communication resource and based on the SCI, a second sidelink shared channel communication via the transmit beam.

Another first UE for wireless communications is described. The first UE may include means for communicating control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication, means for receiving, from a second UE, SCI that schedules a first sidelink shared channel communication from the second UE in a first communication resource in a time window of the first set of time windows, means for receiving, from the second UE in the first communication resource in accordance with the SCI, the first sidelink shared channel communication via the receive beam, and means for transmitting, in a second communication resource that at least partially overlaps in time with the first communication resource and based on the SCI, a second sidelink shared channel communication via the transmit beam.

A non-transitory computer-readable medium storing code for wireless communications at a first UE is described. The code may include instructions executable by at least one processor (e.g., directly, indirectly, after pre-processing, without pre-processing) to communicate control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication, receive, from a second UE, SCI that schedules a first sidelink shared channel communication from the second UE in a first communication resource in a time window of the first set of time windows, receive, from the second UE in the first communication resource in accordance with the SCI, the first sidelink shared channel communication via the receive beam, and transmit, in a second communication resource that at least partially overlaps in time with the first communication resource and based on the SCI, a second sidelink shared channel communication via the transmit beam.

In some examples of the method, first UEs, and non-transitory computer-readable medium described herein, the second sidelink shared channel communication may be transmitted to the second UE.

In some examples of the method, first UEs, and non-transitory computer-readable medium described herein, communicating the control signaling may include operations, features, means, or instructions for communicating an indication of a first BPL for communications from the second UE to the first UE and a second BPL for communications from the first UE to the second UE, where the first BPL includes the receive beam and the second BPL includes the transmit beam.

Some examples of the method, first UEs, and non-transitory computer-readable medium described herein may further include operations, features, means, or instructions for identifying a first set of BPLs that support half-duplex sidelink communication between the second UE and the first UE, receiving, from the second UE, a first message indicating a second set of BPLs identified by the second UE that can support the full-duplex sidelink communication between the second UE and the first UE, and transmitting, to the second UE, a second message indicating a third set of BPLs identified by the first UE that can support the full-duplex sidelink communication between the second UE and the first UE, where the third set of BPLs may be identified based on the first set of BPLs, where the first BPL and the second BPL may be both included the second set of BPLs and the third set of BPLs.

In some examples of the method, first UEs, and non-transitory computer-readable medium described herein, the second sidelink shared channel communication may be transmitted to a third UE.

In some examples of the method, first UEs, and non-transitory computer-readable medium described herein, communicating the control signaling may include operations, features, means, or instructions for communicating an indication of a set of transmission parameters associated with the full-duplex sidelink communication in the first set of time windows, the set of transmission parameters including at least one of a transmission power, a transmission timing, an MCS, a rank, a precoding matrix, or a target RSRP, where the first sidelink shared channel communication may be received in accordance with the set of transmission parameters.

Some examples of the method, first UEs, and non-transitory computer-readable medium described herein may further include operations, features, means, or instructions for receiving, from the second UE, a second SCI that schedules a third sidelink shared channel communication in a third communication resource in a second time window of the first set of time windows, where the SCI indicates that the third sidelink shared channel communication may be a half-duplex communication, and where the control signaling indicates a second set of transmission parameters associated with half-duplex sidelink communication in the first set of time windows and receiving, from the second UE in the third communication resource in accordance with the second set of transmission parameters, the third sidelink shared channel communication via the receive beam.

Some examples of the method, first UEs, and non-transitory computer-readable medium described herein may further include operations, features, means, or instructions for transmitting a second SCI that schedules the second sidelink shared channel communication, where the second SCI may be responsive to the SCI.

In some examples of the method, first UEs, and non-transitory computer-readable medium described herein, communicating the control signaling may include operations, features, means, or instructions for receiving the control signaling from a network entity.

In some examples of the method, first UEs, and non-transitory computer-readable medium described herein, communicating the control signaling may include operations, features, means, or instructions for receiving the control signaling from one of the second UE or a third UE to which the second sidelink shared channel communication may be transmitted.

In some examples of the method, first UEs, and non-transitory computer-readable medium described herein, communicating the control signaling may include operations, features, means, or instructions for transmitting the control signaling to one of the second UE or a third UE to which the second sidelink shared channel communication may be transmitted.

In some examples of the method, first UEs, and non-transitory computer-readable medium described herein, the first communication resource at least partially overlaps in frequency with the second communication resource.

In some examples of the method, first UEs, and non-transitory computer-readable medium described herein, the first communication resource includes a first set of frequency resources and the second communication resource includes a second set of frequency resources and the first set of frequency resources may be separated in frequency from the second set of frequency resources.

In some examples of the method, first UEs, and non-transitory computer-readable medium described herein, the control signaling indicates the transmit beam at the first UE via indicating a first TCI state and the control signaling indicates the receive beam at the first UE via indicating a second TCI state.

Some examples of the method, first UEs, and non-transitory computer-readable medium described herein may further include operations, features, means, or instructions for monitoring sidelink resources for the first sidelink shared channel communication based on the SCI and selecting, based on the monitoring, the second communication resource for transmission of the second sidelink shared channel communication from a set of configured sidelink communication resources.

In some examples of the method, first UEs, and non-transitory computer-readable medium described herein, the second communication resource may be selected randomly from the set of configured sidelink communication resources.

BRIEF DESCRIPTION OF THE DRAWINGS

FIG. 6 shows an example of a wireless communications system that supports time window based sidelink full-duplex in accordance with one or more aspects of the present disclosure.

FIG. 7 shows an example of a process flow that supports time window based sidelink full-duplex in accordance with one or more aspects of the present disclosure.

Figure 9:
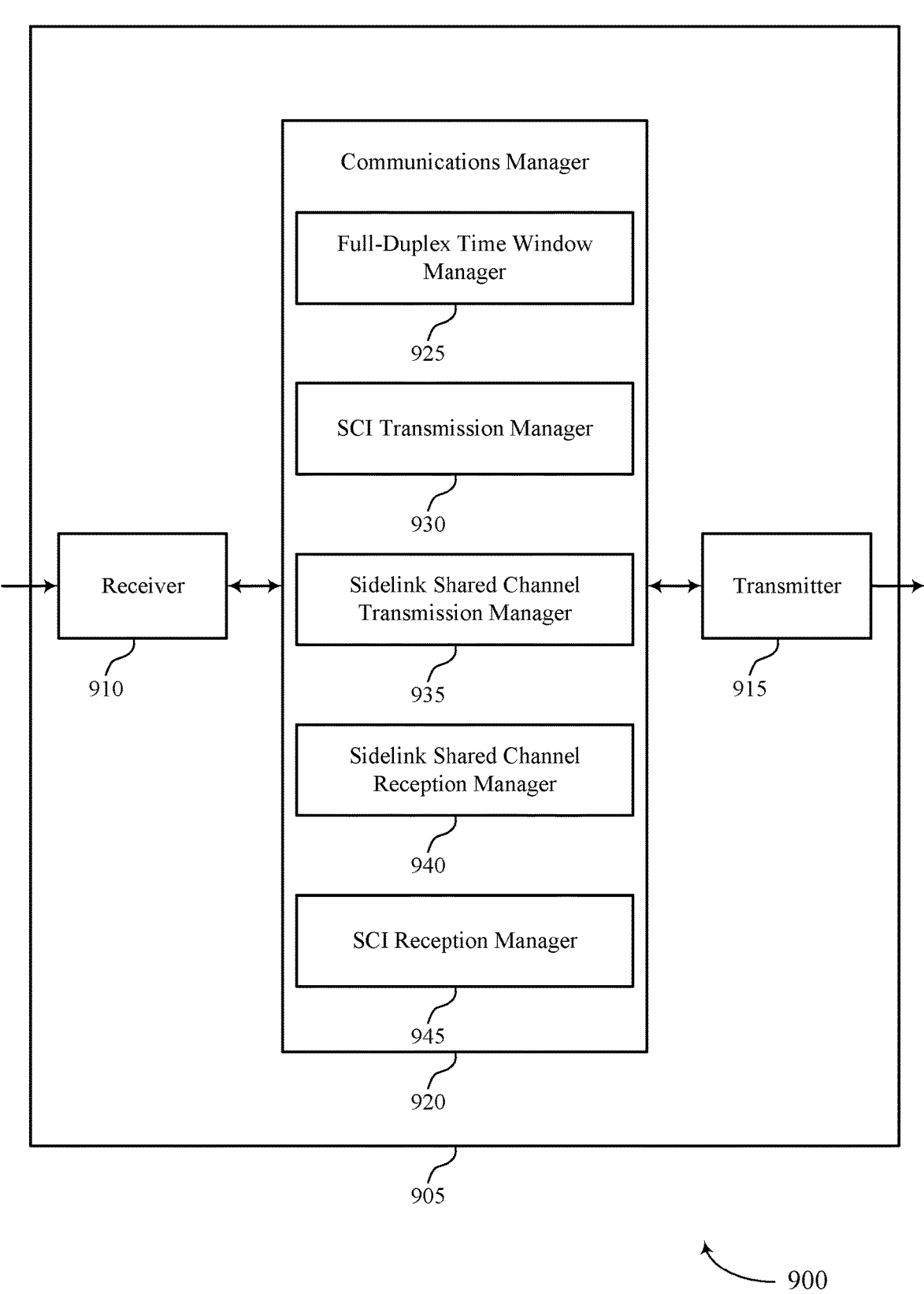

FIGS. 8 and 9 show block diagrams of devices that support time window based sidelink full-duplex in accordance with one or more aspects of the present disclosure.

Figure 10:
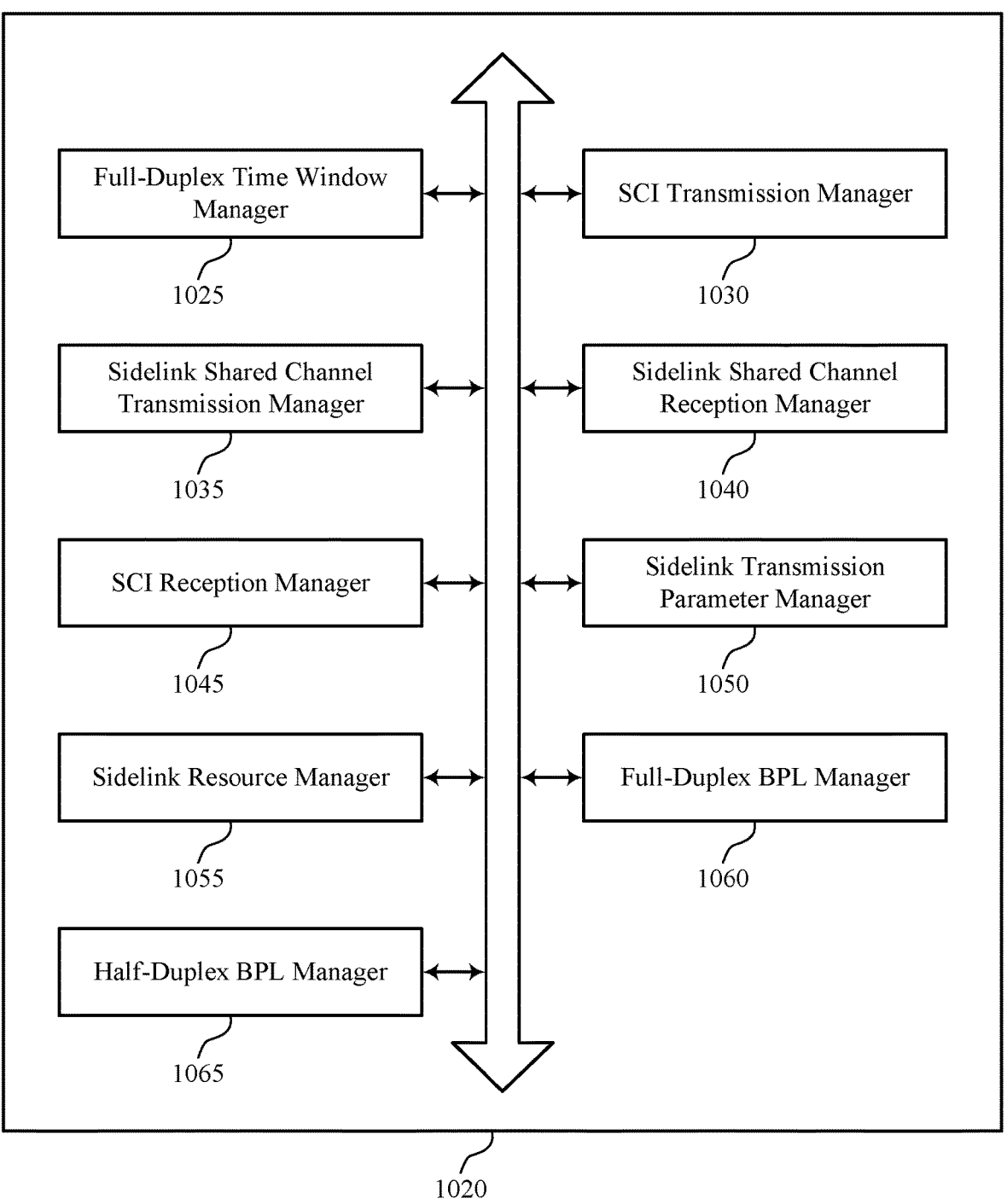

FIG. 10 shows a block diagram of a communications manager that supports time window based sidelink full-duplex in accordance with one or more aspects of the present disclosure.

Figure 11:
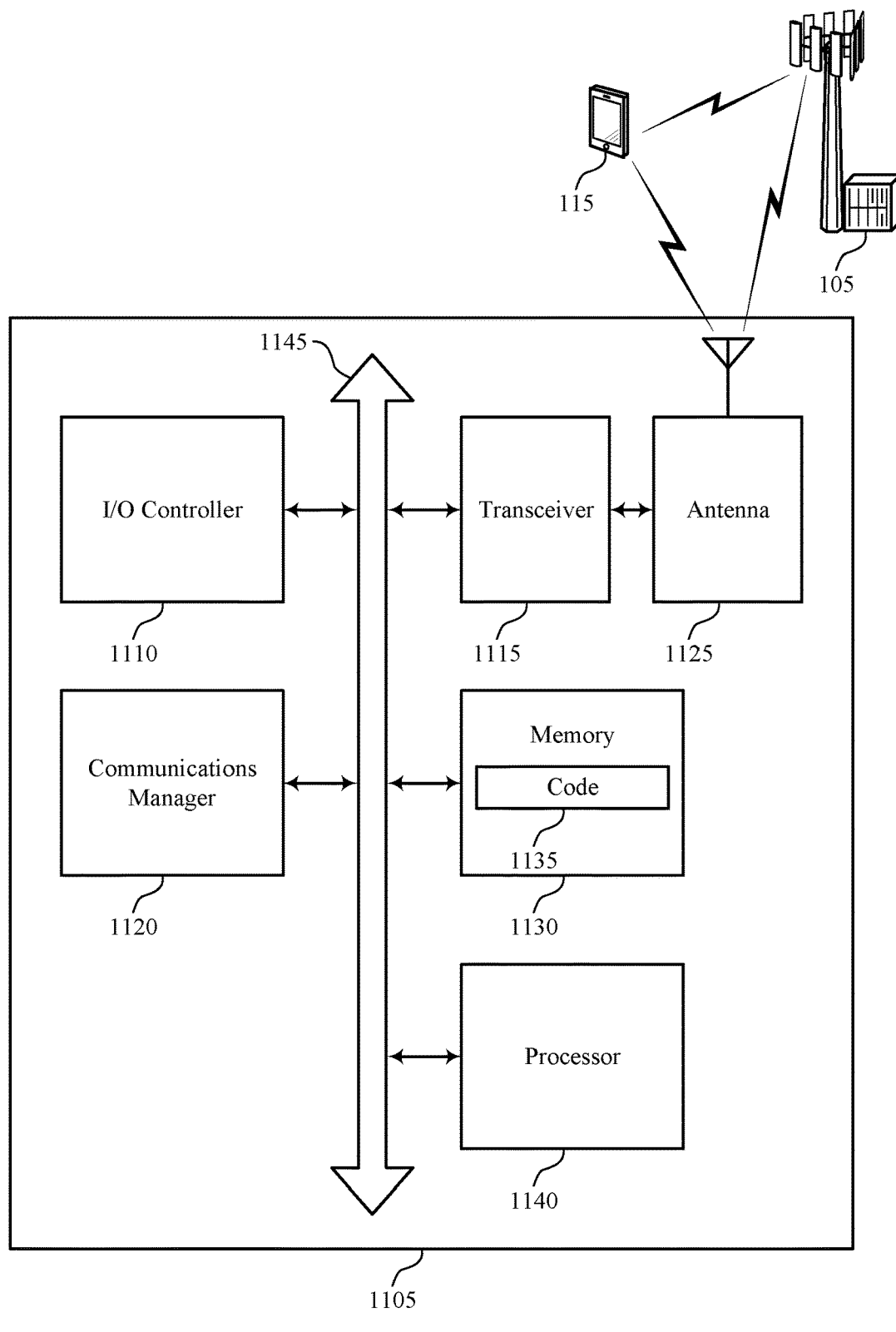

FIG. 11 shows a diagram of a system including a device that supports time window based sidelink full-duplex in accordance with one or more aspects of the present disclosure.

FIGS. 12 and 13 show flowcharts illustrating methods that support time window based sidelink full-duplex in accordance with one or more aspects of the present disclosure.

DETAILED DESCRIPTION

A wireless communications system may support sidelink communication between two or more user equipments (UEs). UEs that are involved in sidelink communication may be configured with a sidelink resources pool. In sidelink mode 1 operation, a network entity may schedule resources for a UE over which the UE may transmit a sidelink shared channel communication (e.g., a physical sidelink shared channel (PSSCH) communication). In sidelink mode 2 operation, a transmitting UE may select resources from the resource pool over which to transmit a sidelink shared channel communication to a receiving UE. In sidelink mode 2, the transmitting UE may transmit sidelink control information (SCI) to the receiving UE indicating the selected resources.

Some UEs may support sidelink full-duplex communications in which the UEs transmit and receive in overlapping time resources. To support sidelink full-duplex communication between two UEs, a first UE transmits via a transmit beam and receives via a receive beam, and a second UE receives via a receive beam that corresponds to the transmit beam of the first UE and transmits via a transmit beam that corresponds to the receive beam at the first UE. The corresponding transmit and receive beams at the first at second UEs may be referred to as beam pair links (BPLs). In sidelink mode 2, indicating in SCI that a first UE supports full-duplex communications for a selected communication resource and the full-duplex parameters, such as the two BPLs, involves high signaling overhead in the SCI.

UEs that operate in sidelink mode 2 may be configured with (e.g., by the network) or may agree upon time windows in which full-duplex communication is supported and time windows in which half-duplex communication is supported. For example, the time windows may be sets of slots or symbols and/or may be periodic or semi-persistent (e.g., a periodic pattern may be activated or deactivated dynamically). The UEs may agree upon BPLs to be used for full-duplex communication during the full-duplex time windows. A first UE may transmit an SCI that schedules a first sidelink shared channel communication in a first communication resource in a time window that is configured for full-duplex communication at the first UE. For transmission of the first sidelink shared channel communication, the first UE may use the first BPL indicated for full-duplex transmission at the first UE. Based on the SCI, a second UE may identify that the first sidelink shared channel communication is scheduled in the first communication resource in a full-duplex time window and may transmit a second sidelink shared channel communication to the first UE in a second communication resource that at least partially overlaps with the first communication resource in the time domain. The second UE may use the BPL indicated for full-duplex reception at the first UE. The second UE may either be the UE scheduled to receive the first sidelink shared channel communication or another UE. For example, the first UE may simultaneously transmit and receive sidelink shared channel communications with the second UE using indicated or agreed upon BPLs between the first and second UEs, or the first UE may simultaneously transmit the first sidelink shared channel communication to a third UE using an indicated or agreed upon BPL between the first and third UEs and receive a second sidelink shared channel communication from a second UE using an indicated or agreed upon BPL between the first and second UEs.

Aspects of the disclosure are initially described in the context of wireless communications systems. Aspects of the disclosure are further illustrated by and described with reference to time window diagrams, resource diagrams, process flows, apparatus diagrams, system diagrams, and flowcharts that relate to time window based sidelink full-duplex.

Figure 1:
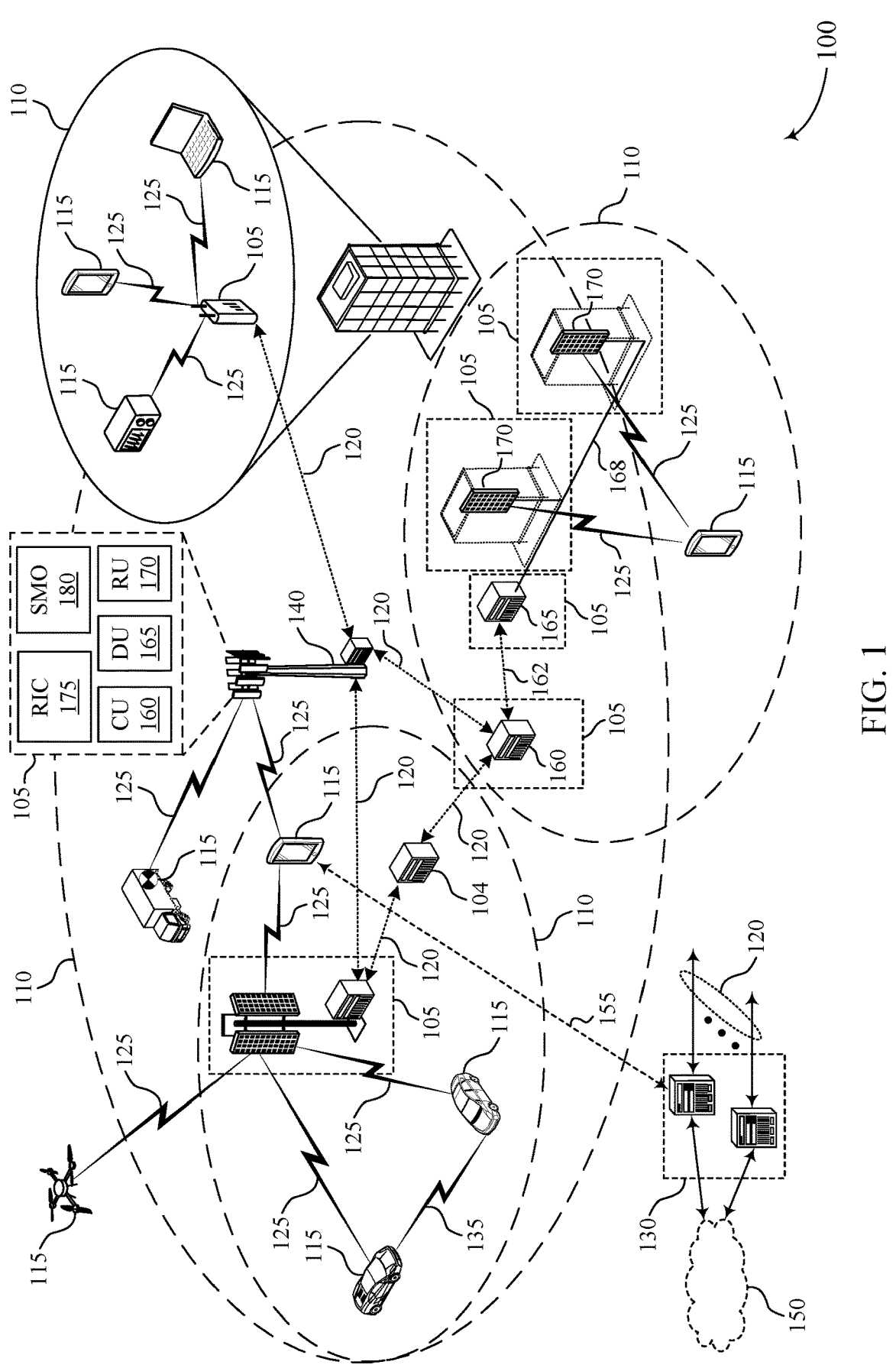
FIG. 1 shows an example of a wireless communications system that supports time window based sidelink full-duplex in accordance with one or more aspects of the present disclosure.

FIG. 1 shows an example of a wireless communications system 100 that supports time window based sidelink full-duplex in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support time window based sidelink full-duplex as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, an MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)).

Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support sidelink communication between two or more UEs 115. UEs 115 that are involved in sidelink communication may be configured with a sidelink resources pool, for example, by a serving network entity 105. In sidelink mode 1 operation, a network entity 105 may schedule resources for a UE 115 over which the UE 115 may transmit a sidelink shared channel communication (e.g., a PSSCH communication). In sidelink mode 2 operation, the UEs 115 may autonomously select resources for sidelink communications from a configured sidelink resource pool. For example, a transmitting UE 115 may select resources from the sidelink resource pool over which to transmit a sidelink shared channel communication to a receiving UE. In sidelink mode 2, the transmitting UE 115 may transmit SCI to the receiving UE 115 indicating the selected resources.

Some UEs 115 may support sidelink full-duplex communications in which the UEs transmit and receive in overlapping time resources. To support sidelink full-duplex communication between two UEs 115, a first UE transmits via a transmit beam and receives via a receive beam, and a second UE 115 receives via a receive beam that corresponds to the transmit beam of the first UE 115 and transmits via a transmit beam that corresponds to the receive beam at the first UE 115. In sidelink mode 2, if the first UE 115 reserves a first sidelink communication resource for a sidelink shared channel communication, a second UE 115 should know that the first UE 115 is capable of full-duplex in order to transmit a sidelink shared channel communication to the first UE in a second sidelink communication resource that at least partially overlaps with the first communication resource in the time domain. Further, a UE 115 may be capable of full-duplex communications in some sidelink communications resources but not other sidelink communications resources, for example, due to channel conditions or transmission parameters (e.g., which beams are used, time and frequency resources, transmission power, modulation and coding scheme (MCS), and/or MIMO schemes).

In some examples, in frequency range 2 (FR2) operation, UEs 115 may support beam based full-duplex opportunity announcement. For example, the first UE 115 may indicate in SCI that schedules a first sidelink communication resource for a first sidelink shared channel communication that a second UE 115 is allowed to transmit in a second communication resource that at least partially overlaps with the first communication resource in the time domain. The SCI may also indicate the allowed transmission parameters for a transmission from the second UE in the second communication resource (e.g., the transmit beam or the guard band between the first communication resource and the second communication resource). For example, the SCI may indicate that the second UE 115 is allowed to use a transmit beam that corresponds to a receive beam at the first UE 115 that does not interfere with the transmit beam at the first UE used for transmission of the first sidelink shared channel communication. Indicating in an SCI that a first UE 115 supports full-duplex communications for a selected communication resource and indicating the full-duplex parameters, such as the two BPLs, however, may involves high signaling overhead in the SCI.

UEs 115 that operate in sidelink mode 2 may be configured with (e.g., by the network) or may agree upon time windows in which full-duplex communication is supported and time windows in which half-duplex communication is supported. For example, the time windows may be sets of slots or symbols and/or may be periodic. The UEs 115 may agree upon BPLs to be used for full-duplex communication during the full-duplex time windows. A first UE 115 may transmit an SCI that schedules a first sidelink shared channel communication in a first communication resource in a time window that is configured for full-duplex communication at the first UE 115. For transmission of the first sidelink shared channel communication, the first UE 115 may use the first BPL indicated for full-duplex transmission at the first UE 115. Based on the SCI, a second UE 115 may identify that the first sidelink shared channel communication is scheduled in the first communication resource in a full-duplex time window and may transmit a second sidelink shared channel communication to the first UE 115 in a second communication resource that at least partially overlaps with the first communication resource in the time domain. The second UE 115 may use the BPL indicated for full-duplex reception at the first UE 115. The second UE 115 may either be the UE 115 scheduled to receive the first sidelink shared channel communication or another UE 115. For example, the first UE 115 may simultaneously transmit and receive sidelink shared channel communications with the second UE using indicated or agreed upon BPLs between the first and second UEs 115, or the first UE 115 may simultaneously transmit the first sidelink shared channel communication to a third UE using an indicated or agreed upon BPL between the first and third UEs 115 and receive a second sidelink shared channel communication from a second UE 115 using an indicated or agreed upon BPL between the first and second UEs 115.

Figure 2:
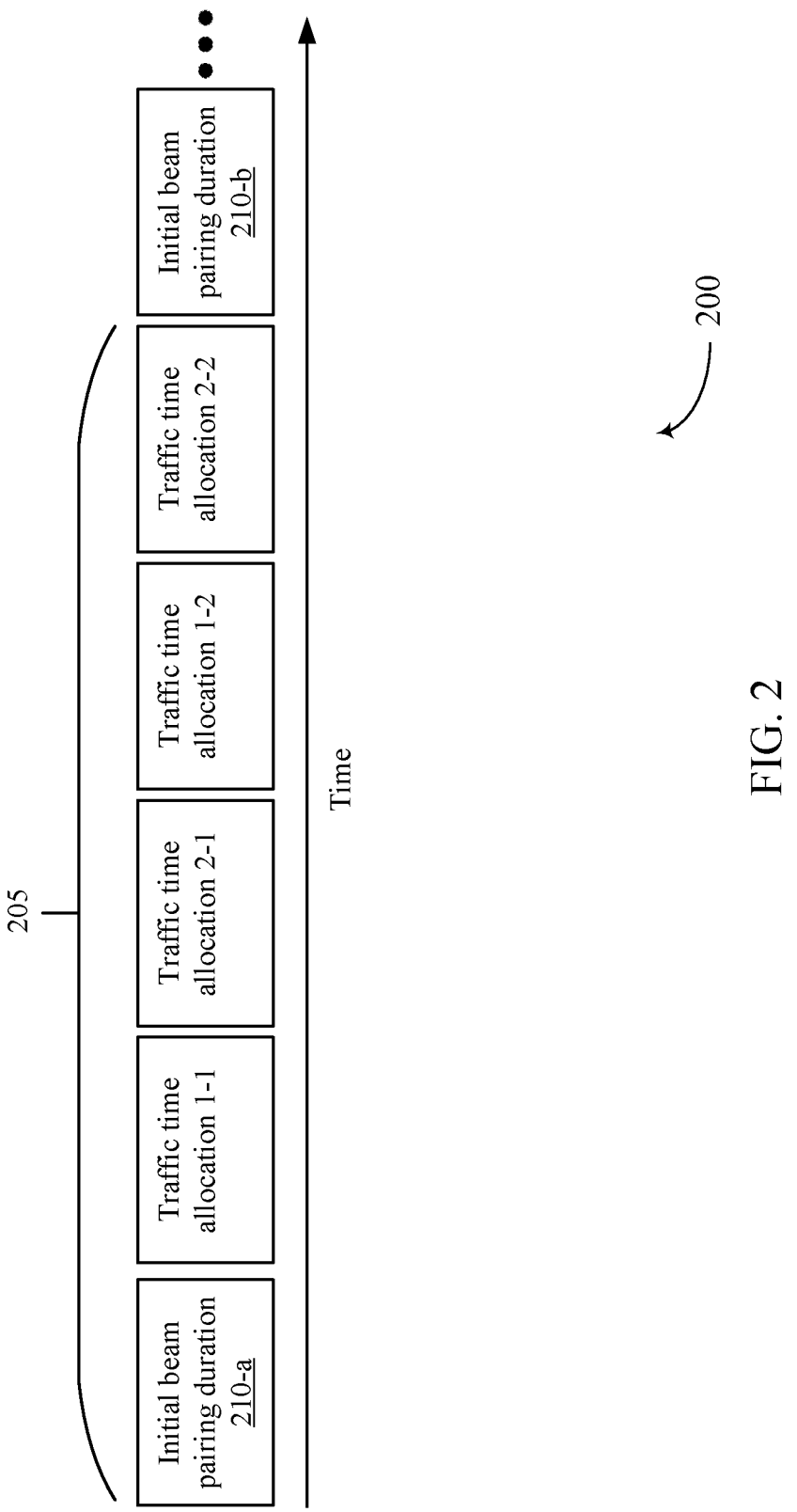
FIG. 2 shows an example of a time window diagram that supports time window based sidelink full-duplex in accordance with one or more aspects of the present disclosure.

FIG. 2 shows an example of a time window diagram 200. The time window diagram 200 may implement or may be implemented by aspects of the wireless communications system 100.

In some wireless communications systems, FR2 may support time window based beam scheduling. For example, an initial beam pairing period 205 may include an initial beam pairing duration 210-*a* and multiple traffic time allocations (e.g., traffic time allocation 1-1, traffic time allocation 2-1, traffic time allocation 1-2, and traffic time allocation 2-2 as shown in FIG. 2). During the initial beam pairing duration 210-*a*, each UE 115 may broadcast discovery reference signals and may receive a potential connection setup request from a neighbor UE 115 in a beam sweep manner, for example, similarly to synchronization signal block (SSB) and random access channel (RACH) procedures in Uu. After the connection setup between the UEs 115 during the initial beam pairing duration 210-*a*, each UE 115 may use a same beam for sensing a transmission to communicate with another UE 115 in a given traffic time allocation. Given beams may be assigned or used in different traffic time allocations, and some traffic time allocations may be assigned or associated with the same beams. For example, traffic time allocation 1-1 may be assigned or associated with the same beams as traffic time allocation 1-2, and traffic time allocation 2-1 may be assigned or associated with the same beams as traffic time allocation 2-2. The traffic time allocations that are assigned or associated with the same beams in the initial beam pairing period 205 may be discontinuous in time and may have unequal lengths. For example, traffic time allocation 1-1 may be discontinuous from and have a different duration than traffic time allocation 1-2, and traffic time allocation 2-1 may be discontinuous from and have a different duration than traffic time allocation 2-2.

After the initial beam pairing period 205, the UEs 115 may perform another connection setup for another initial beam pairing period during another initial beam pairing duration 210-*b*.

Figure 3:
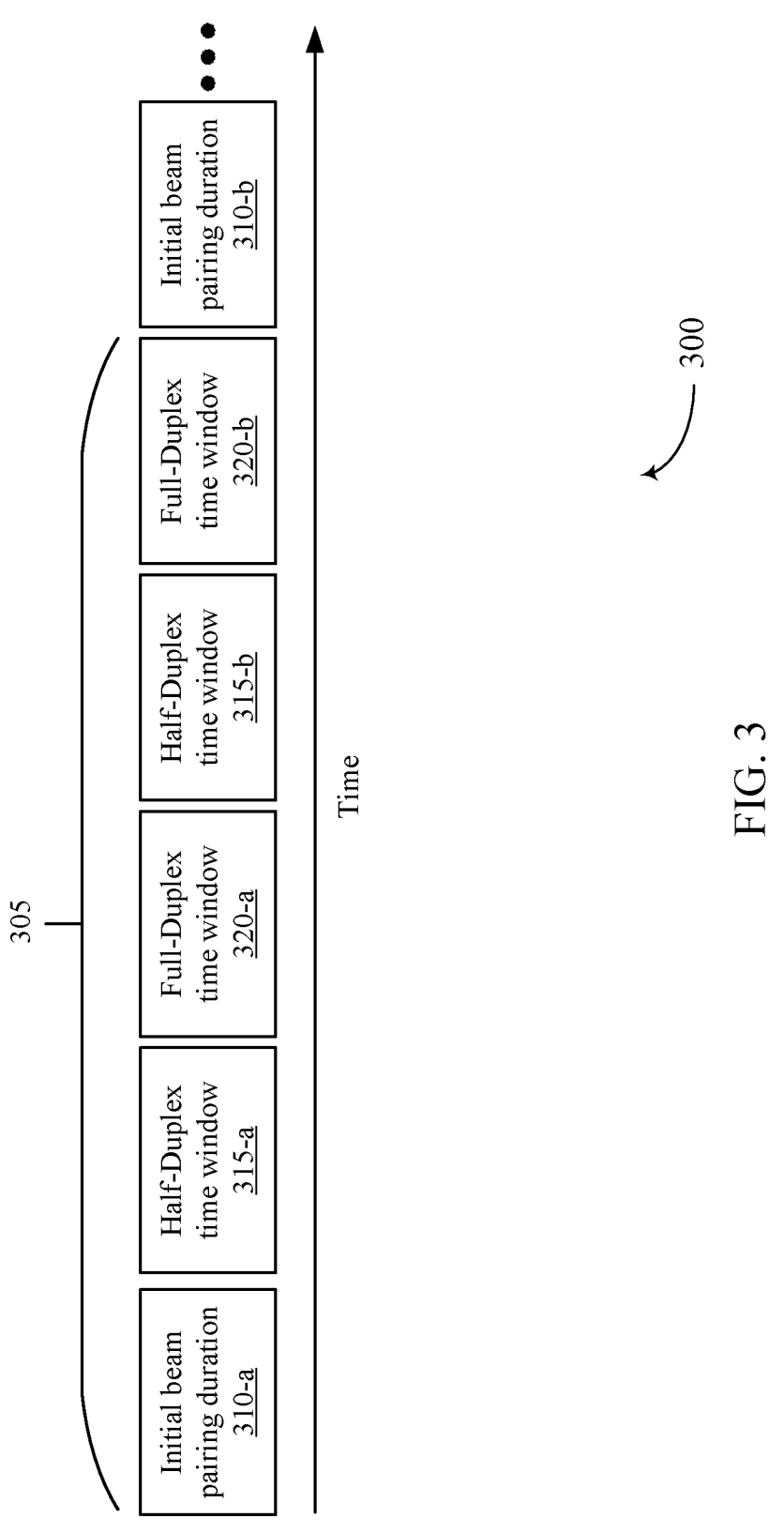
FIG. 3 shows an example of a time window diagram that supports time window based sidelink full-duplex in accordance with one or more aspects of the present disclosure.

FIG. 3 shows an example of a time window diagram 300 that supports time window based sidelink full-duplex in accordance with one or more aspects of the present disclosure. The time window diagram 300 may implement or may be implemented by aspects of the wireless communications system 100.

In some examples, time window based beam scheduling may be extended to sidelink full-duplex operation. As shown, a beam pairing period 305 may be split into half-duplex time windows 315 (e.g., a half-duplex time window 315-*a* and a half-duplex time window 315-*b*) and full-duplex time windows (e.g., a full-duplex time window 320-*a* and a full-duplex time window 320-*b*). For example, time windows may be a quantity of slots or symbols.

During the initial beam pairing duration 310-*a*, the UEs 115 may identify BPLs for communications during the half-duplex time windows 315 and the full-duplex time windows 320. In some examples, the beams selected for the full-duplex time windows 320 may be based on the beams selected for the half-duplex time windows 315. The transmission parameters for full-duplex communications in the full-duplex time windows 320 may be determined or agreed upon in advance (e.g., during the initial beam pairing duration 310-*a* or during a half-duplex time window 315), and thus the BPLs for full-duplex communications and the full-duplex transmission parameters are not dynamically indicated in SCI, thus reducing signaling overhead in SCI. The full-duplex time windows 315 may be periodic with discontinuous durations per period (e.g., the full-duplex time window 320-*a* and the full-duplex time window 320-*b* may have unequal lengths).

After the beam pairing period 305, the UEs 115 may perform another connection setup for another initial beam pairing period during another initial beam pairing duration 310-*b*.

Figure 4:
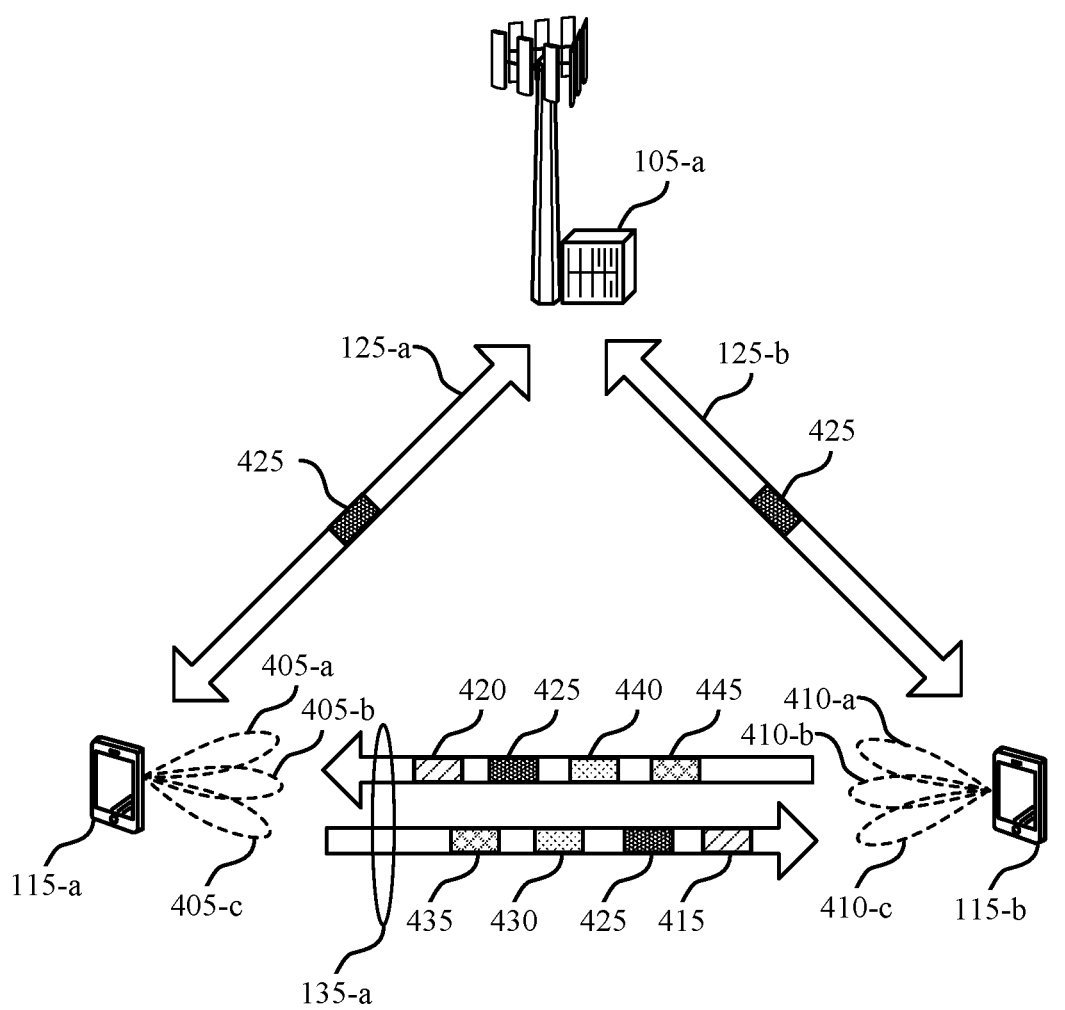
FIG. 4 shows an example of a wireless communications system that supports time window based sidelink full-duplex in accordance with one or more aspects of the present disclosure.

FIG. 4 shows an example of a wireless communications system 400 that supports time window based sidelink full-duplex in accordance with one or more aspects of the present disclosure. The wireless communications system 400 may implement aspects of or may be implemented by aspects of the wireless communications system 100. For example, the wireless communications system 400 includes a UE 115-*a* and a UE 115-*b*, which may be examples of a UE 115 described with respect to FIG. 1. The wireless communications system 400 also includes a network entity 105-*a*, which may be an example of a network entity 105 as described with respect to FIG. 1.

The UE 115-*a* may communicate with the network entity 105-*a* using a communication link 125-*a*, and the UE 115-*b* may communicate with the network entity 105-*a* using a communication link 125-*b*. The communication link 125-*a* may be an example of an NR or LTE link between the UE 115-*a* and the network entity 105-*a*. The communication link 125-*b* may be an example of an NR or LTE link between the UE 115-*b* and the network entity 105-*a*. The communication link 125-*a* and the communication link 125-*b* may include bi-directional links that enable both uplink and downlink communications. For example, the UE 115-*a* may transmit uplink signals (e.g., uplink transmissions), such as uplink control signals or uplink data signals, to the network entity 105-*a* using the communication link 125-*a* and the network entity 105-*a* may transmit downlink signals (e.g., downlink transmissions), such as downlink control signals or downlink data signals, to the UE 115-*a* using the communication link 125-*a*. The UE 115-*b* may transmit uplink signals (e.g., uplink transmissions), such as uplink control signals or uplink data signals, to the network entity 105-*a* using the communication link 125-*b* and the network entity 105-*a* may transmit downlink signals (e.g., downlink transmissions), such as downlink control signals or downlink data signals, to the UE 115-*b* using the communication link 125-*b*.

The UE 115-*a* may communicate with the UE 115-*b* using a communication link 135-*a*, which may be an example of a communication link 135 as described herein. The communication link 135-*a* may be an example of an NR or LTE sidelink between the UE 115-*a* and the UE 115-*b*. The communication link 135-*a* may include bi-directional links that enable the UE 115-*a* to transmit to the UE 115-*b* and the UE 115-*b* to transmit to the UE 115-*a*.

The UE 115-*a* and the UE 115-*b* may operate in accordance with time window based beam scheduling, for example, as described with reference to FIG. 3. For example, the UE 115-*a* may communicate over the communication link 135-*a* using a set of beams 405 (e.g., which may include a beam 405-*a*, a beam 405-*b*, and a beam 405-*c*) and the UE 115-*b* may communicate over the communication link 135-*a* using a set of beams 410 (e.g., which may include a beam 410-*a*, a beam 410-*b*, and a beam 410-*c*). During an initial beam pairing duration, the UE 115-*a* and the UE 115-*b* may identify BPLs from among the set of beams 405 and the set of beams 410 for half-duplex communications from the UE 115-*a* to the UE 115-*b*, for half-duplex communications from the UE 115-*b* to the UE 115-*a*, for full-duplex communications from the UE 115-*a* to the UE 115-*b*, and/or for full-duplex communications from the UE 115-*b* to the UE 115-*a*.

The UE 115-*a* and the UE 115-*b* may communicate control signaling 425 which may indicate the full-duplex time windows and the half-duplex time windows within a beam pairing period. In some examples, the control signaling 425 may be received from the network entity 105-*a*. For example, the network entity 105-*a* may indicate sets of resource pools for full-duplex communications and sets of resource pools for half-duplex communications. In some examples, the UEs 115 may autonomously determine the full-duplex time windows and the half-duplex time windows (e.g., arbitrarily). For example, the UE 115-*a* may transmit the control signaling 425 to the UE 115-*b*, or the UE 115-*b* may transmit the control signaling 425 to the UE 115-*a*.

As described herein, the UE 115-*a* and the UE 115-*b* may identify the BPLs for full-duplex communications in the full-duplex time windows. For example, the BPLs for full-duplex communications may be determined during an initial beam pairing duration or during a half-duplex time window. In some examples, the UE 115-*a* and the UE 115-*b* may first determine a set of BPLs for half-duplex operation. For example, the UE 115-*a* and the UE 115-*b* may identify that a first BPL that includes the beam 405-*a* and the beam 410-*a*, a second BPL that includes the beam 405-*c* and the beam 410-*c*, a third BPL beam that includes a fourth beam at the UE 115-*a* and a fourth beam at the UE 115-*b*, and a fourth BPL that includes a fifth beam at the UE 115-*a* and a fifth beam at the UE 115-*b* satisfy one or more conditions for supporting half-duplex operation. Among the identified set of BPLs for half-duplex operation, the UE 115-*a* may indicate in a first message 415 to the UE 115-*b* a set of BPLs that support full-duplex operation at the UE 115-*a* (e.g., satisfy one or more conditions for supporting full-duplex operation such as low self-interference or high signal-to-interference-and-noise-ratio). For example, the UE 115-*a* may indicate that the first BPL that includes the beam 405-*a* and the beam 410-*a* and the second BPL that includes the beam 405-*c* and the beam 410-*c* support full-duplex operation at the UE 115-*a* with low self-interference based on measurements by the UE 115-*a* of traffic of the UE 115-*a* or a dedicated reference signal transmission. The UE 115-*b* may indicate in a second message 420 to the UE 115-*a* a set of the BPLs indicated in the first message 415 that that support full-duplex operation at the UE 115-*b* (e.g., satisfy one or more conditions for supporting full-duplex operation such as low self-interference or high signal-to-interference-and-noise-ratio). For example, the UE 115-*b* may indicate that the first BPL that includes the beam 405-*a* and the beam 410-*a* and the second BPL that includes the beam 405-*c* and the beam 410-*c* support full-duplex operation at the UE 115-*b* with low self-interference based on measurements by the UE 115-*b* of traffic of the UE 115-*b* or a dedicated reference signal transmission. The UE 115-*b* may also indicate in the second message 420 which communication direction is associated with each BPL. For example, the UE 115-*b* may indicate that the first BPL that includes the beam 405-*a* and the beam 410-*a* should be used for communications from the UE 115-*a* to the UE 115-*b* and that the second BPL that includes the beam 405-*c* and the beam 410-*c* should be used for communications from the UE 115-*b* to the UE 115-*a*. For example, for full-duplex communications, the beam 405-*a* may be the transmit beam at the UE 115-*a*, the beam 405-*c* may be the receive beam at the UE 115-*a*, the beam 410-*a* may be the receive beam at the UE 115-*b*, and the beam 410-*c* may be the transmit beam at the UE 115-*b*.

In some examples, the UE 115-*a* and the UE 115-*b* may agree upon or may be indicated with transmission parameters for full-duplex communications during the full-duplex time windows and/or separate transmission parameters for half-duplex communications during the full-duplex time windows. For example, the transmission parameters for full-duplex communications during the full-duplex time windows may include transmission power, transmission timing, MCS, rank, a precoding matrix, or a target reference signal received power (RSRP) at the receiving UE 115. For example, the control signaling 425 may indicate the transmission parameters. In some examples, the transmission parameters may be included in the first message 415 or the second message 420. In some examples, the control signaling 425 may also indicate the BPLs for the full-duplex time windows. For example, the control signaling 425 may be transmitted based on the second message 420, or the control signaling 425 may be transmitted in a same control message as the second message 420. Transmission parameters may be different for half-duplex transmissions in a full-duplex time window. For example, if the UE 115-*a* identifies that the UE 115-*b* will not transmit a sidelink shared channel communication that at least partially overlaps with a sidelink shared channel communication 435 scheduled by an SCI 430, the UE 115-*a* may use half-duplex transmission parameters for the sidelink shared channel communication 435. For example, the UE 115-*b* may not transmit a sidelink shared channel communication that at least partially overlaps with a sidelink shared channel communication 435 scheduled by an SCI 430 if the UE 115-*b* does not have data to send.

During the full-duplex time windows, each UE 115 (e.g., the UE 115-*a* and the UE 115-*b*) may independently perform resource selection, for example, based on sensing results during a sensing window or based on random selection within a resource selection window. For example, the UE 115-*a* may select a first communication resource for a sidelink shared channel communication 435 from a configured sidelink resource pool. The selected first communication resource is within a time window that is a full-duplex time window. The UE 115-*a* may transmit an SCI 430 that reserves the first communication resource for the sidelink shared channel communication 435. The SCI 430 may not indicate the full-duplex transmission parameters (e.g., BPL (s), transmission power, transmission timing, MCS, rank, precoding matrix, or target RSRP at the UE 115-*b*) as the full-duplex transmission parameters are pre-associated with the full-duplex time window. The UE 115-*b* may sense the SCI 430 and identify the first communication resource reserved by the SCI 430. The UE 115-*b* may select available resources (e.g., a second communication resource) that overlaps in time with the first communication resource based on the first communication resource being in a full-duplex time window. The UE 115-*b* may transmit a sidelink shared channel communication 445 in the selected second communication resource that overlaps in time with the first communication resource for the sidelink shared channel communication 435. In some examples, the UE 115-*b* may transmit an SCI 440 that reserves the second communication resource for the sidelink shared channel communication 445.

In the case of sensing-based resource selection, the available resources for the second communication resource for the sidelink shared channel communication 445 may be resources that are not used by UEs 115 other than the UE 115-*a* based on sensing results by the UE 115-*b* during a sensing window. For example, the UE 115-*b* may use the beam 410-*c* for sensing and may use the beam 410-*a* to receive transmissions from the UE 115-*a* (e.g., the SCI 430 and the sidelink shared channel communication 435). Based on the sensing with the beam 410-*c*, the UE 115-*b* may decode the SCI 430 transmitted by the UE 115-*a* and identify the first communication resource reserved by the SCI 430. The UE 115-*b* may also decode or identify other SCIs from other nearby UEs 115 which reserve other communication resources for their sidelink transmissions. The UE 115-*b* may then select a second communication resource that overlaps in time with the first communication resource for the sidelink shared channel communication 435, as long as the second communication resource does not overlap with resources used by those other UEs (except the first UE). In the case of random resource selection, the available resources for the second communication resource for the sidelink shared channel communication 445 may be all resources in the resource selection window and the UEs 115 may randomly choose a resource for sidelink communication from the available resources.

Figure 5:
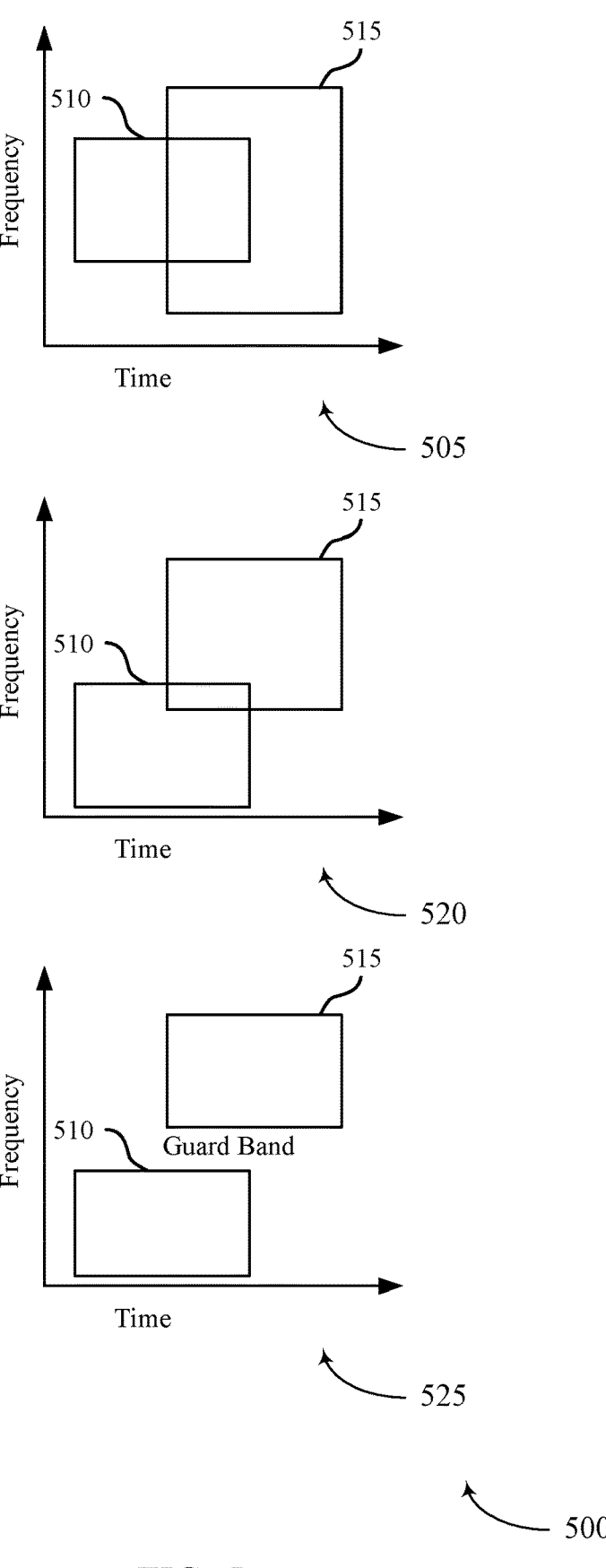
FIG. 5 shows an example of a resource diagram that supports time window based sidelink full-duplex in accordance with one or more aspects of the present disclosure.

FIG. 5 shows an example of a resource diagram 500 that supports time window based sidelink full-duplex in accordance with one or more aspects of the present disclosure. The time window diagram 500 may implement or may be implemented by aspects of the wireless communications system 100 or the wireless communications system 400. In the frequency domain, sidelink full-duplex communications between UEs 115 may fully overlap, may partially overlap, or may not overlap.

For example, in a first example resource diagram 505, a first sidelink shared channel communication 510 transmitted by a UE 115 may fully overlap in the frequency domain with a second sidelink shared channel communication 515 received by the UE 115. For example, for each symbol where the UE 115 simultaneously transmits the first sidelink shared channel communication 510 and receives the second sidelink shared channel communication 515, the resource blocks of the first sidelink shared channel communication 510 are fully contained within the resource blocks of the second sidelink shared channel communication 515.

In a second example resource diagram 520, the first sidelink shared channel communication 510 transmitted by the UE 115 may partially overlap in the frequency domain with the second sidelink shared channel communication 515 received by the UE 115. For example, for each symbol where the UE 115 simultaneously transmits the first sidelink shared channel communication 510 and receives the second sidelink shared channel communication 515, the resource blocks of the first sidelink shared channel communication 510 may partially overlap with the resource blocks of the second sidelink shared channel communication 515. In some examples, a maximum quantity of overlapped resource blocks or tones may be determined by the UEs 115, may be indicated by a serving network entity 105, or may be standardized.

In a third example resource diagram 525, the first sidelink shared channel communication 510 transmitted by the UE 115 does not overlap in the frequency domain with the second sidelink shared channel communication 515 received by the UE 115. For example, for each symbol where the UE 115 simultaneously transmits the first sidelink shared channel communication 510 and receives the second sidelink shared channel communication 515, the resource blocks of the first sidelink shared channel communication 510 are separated by a guard band from the resource blocks of the second sidelink shared channel communication 515. In some examples, a minimum guard band size (e.g., in terms or resource blocks or tones) may be determined by the UEs 115, may be indicated by a serving network entity 105, or may be standardized.

FIG. 6 shows an example of a wireless communications system 600 that supports time window based sidelink full-duplex in accordance with one or more aspects of the present disclosure. The wireless communications system 600 may implement aspects of or may be implemented by aspects of the wireless communications system 100. For example, the wireless communications system 600 includes a UE 115-*c*, a UE 115-*d*, and a UE 115-*e*, which may be examples of a UE 115 described with respect to FIG. 1.

The UE 115-*c* may communicate with the UE 115-*d* using a communication link 135-*b*, which may be an example of a communication link 135 as described herein. The communication link 135-*b* may be an example of an NR or LTE sidelink between the UE 115-*c* and the UE 115-*d*. The communication link 135-*b* may include bi-directional links that enable the UE 115-*c* to transmit to the UE 115-*d* and the UE 115-*d* to transmit to the UE 115-*c*. The UE 115-*c* may communicate with the UE 115-*e* using a communication link 135-*c*, which may be an example of a communication link 135 as described herein. The communication link 135-*c* may be an example of an NR or LTE sidelink between the UE 115-*c* and the UE 115-*e*. The communication link 135-*c* may include bi-directional links that enable the UE 115-*c* to transmit to the UE 115-*e* and the UE 115-*e* to transmit to the UE 115-*c*.

The UE 115-*c*, the UE 115-*d*, and the UE 115-*e* may operate in accordance with time window based beam scheduling, for example, as described with reference to FIG. 3. For example, the UE 115-*c* may communicate over the communication link 135-*b* or the communication link 135-*c* using a set of beams 605 (e.g., which may include a beam 605-*a*, a beam 605-*b*, and a beam 605-*c*), the UE 115-*d* may communicate over the communication link 135-*b* using a set of beams 610 (e.g., which may include a beam 610-*a*, a beam 610-*b*, and a beam 610-*c*), and the UE 115-*e* may communicate over the communication link 135-*c* using a set of beams 650 (e.g., which may include a beam 650-*a*, a beam 650-*b*, and a beam 650-*c*).

The UE 115-*c*, the UE 115-*d*, and the UE 115-*e* may communicate control signaling 625 which may indicate the full-duplex time windows and the half-duplex time windows within a beam pairing period. In some examples, the control signaling 625 may be received from a network entity 105 (e.g., as described with reference to FIG. 4). For example, the network entity 105 may indicate sets of resource pools for full-duplex communications and sets of resource pools for half-duplex communications. In some examples, the UEs 115 may autonomously determine the full-duplex time windows and the half-duplex time windows (e.g., arbitrarily). For example, the UE 115-*c* may transmit the control signaling 625 to the UE 115-*d* and the UE 115-*c*.

As described herein, the UE 115-*c*, the UE 115-*d*, and the UE 115-*e* may identify the BPLs for full-duplex communications in the full-duplex time windows. For example, the BPLs for full-duplex communications may be determined during an initial beam pairing duration or during a half-duplex time window. In some examples, the UE 115-*c*, the UE 115-*d*, and the UE 115-*e* may first determine sets of BPLs for half-duplex operation. Based on the sets of BPLs for half-duplex operation, the UE 115-*c*, the UE 115-*d*, and the UE 115-*e* may identify BPLs for full-duplex operation. For example, the UE 115-*c* may transmit a first message 615-*a* to the UE 115-*d* that indicates a set of BPLs that support full-duplex operation at the UE 115-*c*, and in response the UE 115-*d* may transmit a second message 620-*a* that indicates a set of the BPLs indicated in the first message 615-*a* that support full-duplex operation at the UE 115-*d*. In some examples, the second message 620-*a* may indicate the corresponding directions of the BPLs. For example, the second message 620-*a* may indicate that a first BPL that includes the beam 605-*a* and the beam 610-*a* should be used for transmissions from the UE 115-*c* to the UE 115-*d* and that a second BPL that includes the beam 605-*c* and the beam 610-*c* should be used for transmissions from the UE 115-*d* to the UE 115-*c*. Similarly, the UE 115-*c* may transmit a first message 615-*b* to the UE 115-*e* that indicates a set of BPLs that support full-duplex operation at the UE 115-*c*, and in response the UE 115-*e* may transmit a second message 620-*b* that indicates a set of the BPLs indicated in the first message 615-*b* that support full-duplex operation at the UE 115-*e*. In some examples, the second message 620-*b* may indicate the corresponding directions of the BPLs. For example, the second message 620-*b* may indicate that a first BPL that includes the beam 605-*b* and the beam 650-*b* should be used for transmissions from the UE 115-*c* to the UE 115-*e* and that a second BPL that includes the beam 605-*c* and the beam 650-*c* should be used for transmissions from the UE 115-*e* to the UE 115-*c*.

In some examples, the UE 115-*c*, the UE 115-*d*, and the UE 115-*e* may agree upon or may be indicated with transmission parameters for full-duplex communications during the full-duplex time windows and/or separate transmission parameters for half-duplex communications during the full-duplex time windows. The UE 115-*c* may select the BPLs to minimize interference at the UE 115-*c* (e.g., transmission using the beam 605-*a* may have low self-interference with reception using the beam 605-*c*). For example, the control signaling 625 may be transmitted based on the second message 620-*a* and the second message 620-*b*, or the control signaling 425 may be transmitted in a same control message as the second message 620-*a* or the second message 620-*b*.

In some examples, for a full-duplex time window, the UE 115-*c* may indicate, for example, in the control signaling 625, for the UE 115-*d* to use the BPL that includes the beam 605-*a* and the beam 610-*a* for reception from the UE 115-*c*. The UE 115-*c* may indicate, for example, in the control signaling 625, for the UE 115-*e* to use the BPL that includes the beam 605-*c* and the beam 650-*c* for transmission to the UE 115-*c*.

In some examples, the UE 115-*c* may select a first communication resource for a sidelink shared channel communication 635 from a configured sidelink resource pool. The first communication resource may be in a time window associated with full-duplex communications. The UE 115-*c* may transmit an SCI 630 that reserves the first communication resource for the sidelink shared channel communication 635. The SCI 630 may not indicate the full-duplex transmission parameters (e.g., BPL(s), transmission power, transmission timing, MCS, rank, precoding matrix, or target RSRP at the UE 115-*d*) as the full-duplex transmission parameters are pre-associated with the full-duplex time window. The UE 115-*d* may sense the SCI 630 and receive the sidelink shared channel communication 635 using the beam 610-*a* based on the indication of the BPL to use for full-duplex communications during the full-duplex time window. The UE 115-*e* may sense the SCI 630 and identify the first communication resource reserved by the SCI 630. The UE 115-*e* may select available resources (e.g., a second communication resource) that overlaps in time with the first communication resource based on the first communication resource being in a full-duplex time window. The UE 115-*e* may transmit a sidelink shared channel communication 645 in the selected second communication resource that overlaps in time with the first communication resource for the sidelink shared channel communication 635. In some examples, the UE 115-*c* may transmit an SCI 640 that reserves the second communication resource for the sidelink shared channel communication 645. The UE 115-*e* may use the beam 605-*c* to transmit the sidelink shared channel communication 645 based on the indication of the BPL to use for full-duplex communications during the full-duplex time window.

In some examples, the UE 115-*e* may select a first communication resource for a sidelink shared channel communication 645 from a configured sidelink resource pool. The first communication resource may be in a time window associated with full-duplex communications. The UE 115-*d* may transmit an SCI 640 that reserves the first communication resource for the sidelink shared channel communication 645. The SCI 640 may not indicate the full-duplex transmission parameters (e.g., BPL(s), transmission power, transmission timing, MCS, rank, precoding matrix, or target RSRP at the UE 115-*c*) as the full-duplex transmission parameters are pre-associated with the full-duplex time window. The UE 115-*e* may use the beam 605-*c* to transmit the sidelink shared channel communication 645 based on the indication of the BPL to use for full-duplex communications during the full-duplex time window. The UE 115-*c* may sense the SCI 640 and receive the sidelink communication resource using the beam 605-*a*. The UE 115-*c* may sense the SCI 640 and identify the first communication resource reserved by the SCI 640. The UE 115-*c* may select available resources (e.g., a second communication resource) that overlaps in time with the first communication resource based on the first communication resource being in a full-duplex time window. The UE 115-*c* may transmit a sidelink shared channel communication 635 to the UE 115-*d* in the selected second communication resource that overlaps in time with the first communication resource for the sidelink shared channel communication 635. In some examples, the UE 115-*e* may transmit an SCI 640 that reserves the second communication resource for the sidelink shared channel communication 645. The UE 115-*d* receives the sidelink shared channel communication 635 using the beam 610-*a* based on the indication of the BPL to use for full-duplex communications during the full-duplex time window.

FIG. 7 shows an example of a process flow 700 that supports time window based sidelink full-duplex in accordance with one or more aspects of the present disclosure. The process flow 700 may include a UE 115-*f* and a UE 115-*g*, which may be examples of a UE 115 as described herein. In the following description of the process flow 700, the operations between the UE 115-*f* and the UE 115-*g* may be transmitted in a different order than the example order shown, or the operations performed by the UE 115-*f* and the UE 115-*g* may be performed in different orders or at different times. Some operations may also be omitted from the process flow 700, and other operations may be added to the process flow 700.

At 705, the UE 115-*f* and the UE 115-*g* may communicate control signal indicating a first set of time windows associated with full-duplex sidelink communication and a second set of time windows associated with half-duplex sidelink communication. The control signaling may indicate a transmit beam at the UE 115-*f* and a receive beam at the UE 115-*f* for the full-duplex sidelink communication. In some examples, the UE 115-*f* and the UE 115-*g* may receive the control signaling from a network entity 105. In some examples, the UE 115-*f* may transmit the control signaling to the UE 115-*g*. In some examples, the UE 115-*g* may transmit the control signaling to the UE 115-*f*. In some examples, the control signaling may indicate the transmit beam and the receive beam via indications of transmission configuration indicator (TCI) states.

At 710, the UE 115-*f* may transmit SCI that schedules a first sidelink shared channel communication in a first communication resource in a time window of the first set of time windows.

At 715, the UE 115-*f* may transmit, to the UE 115-*g* in the first communication resource in accordance with the SCI, the first sidelink shared channel communication via the transmit beam.

At 720, the UE 115-*f* may receive, in a second communication resource that at least partially overlaps in time with the first communication resource, a second sidelink shared channel communication via the receive beam. In some examples, the UE 115-*g* may transmit the second sidelink shared channel communication. In some examples, a third UE 115 may transmit the second sidelink shared channel communication. In some examples, the UE 115-*f* may receive a second SCI that schedules the second sidelink shared channel communication (for example, from the UE 115-*g* or from the third UE if the third UE transmits the second sidelink shared channel communication). In some examples, the first communication resource at least partially overlaps in frequency with the second communication resource. In some examples, the first communication resource is separated in frequency from the second communication resource (e.g., by a guard band).

In some examples, the UE 115-*f* may communicate an indication of a first BPL for communications from the UE 115-*f* to the UE 115-*g* and a second BPL for communications from the UE 115-*g* to the UE 115-*f*, where the first BPL includes the transmit beam and the second BPL includes the receive beam. In some examples, the UE 115-*f* and/or the UE 115-*g* may identify a first set of BPLs that support half-duplex sidelink communication between the UE 115-*f* and the UE 115-*g*. The UE 115-*f* may transmit, to the UE 115-*g*, a first message indicating a second set of BPLs identified by the UE 115-*f* that can support the full-duplex sidelink communication between the UE 115-*f* and the UE 115-*g*, where the second set of BPLs is identified based on the first set of BPLs. The UE 115-*f* may receive, from the UE 115-*g*, a second message indicating a third set of BPLs identified by the UE 115-*g* that can support the full-duplex sidelink communication between the UE 115-*f* and the UE 115-*g*, where the first BPL and the second BPL are both included the second set of BPLs and the third set of BPLs.

In some examples, the control signaling may include an indication of a set of transmission parameters associated with the full-duplex sidelink communication in the first set of time windows. The set of transmission parameters may include at least one of a transmission power, a transmission timing, a MIMO scheme, a rank, a precoding matrix, or a target RSRP, where the first sidelink shared channel communication is transmitted in accordance with the set of transmission parameters. In some examples, the control signaling may include an indication of a second set of transmission parameters associated with half-duplex sidelink communication in the first set of time windows.

In some examples, where the UE 115-*g* transmits the second sidelink communication resource, the UE 115-*g* may monitor sidelink resources for the first sidelink shared channel communication based at least in part on the SCI, and the UE 115-*g* may select, based on the monitoring, the second communication resource for transmission of the second sidelink shared channel communication from a set of configured sidelink communication resources. In some examples, the second communication resource may be selected randomly from the set of configured sidelink communication resources.

FIG. 8 shows a block diagram 800 of a device 805 that supports time window based sidelink full-duplex in accordance with one or more aspects of the present disclosure. The device 805 may be an example of aspects of a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to time window based sidelink full-duplex). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to time window based sidelink full-duplex). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of time window based sidelink full-duplex as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software) executed by at least one processor. If implemented in code executed by at least one processor, the functions of the communications manager 820, the receiver 810, the transmitter 815, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for communicating control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication. The communications manager 820 is capable of, configured to, or operable to support a means for transmitting SCI that schedules a first sidelink shared channel communication in a first communication resource in a time window of the first set of time windows. The communications manager 820 is capable of, configured to, or operable to support a means for transmitting, in the first communication resource in accordance with the SCI, the first sidelink shared channel communication via the transmit beam. The communications manager 820 is capable of, configured to, or operable to support a means for receiving, in a second communication resource that at least partially overlaps in time with the first communication resource, a second sidelink shared channel communication via the receive beam.

Additionally, or alternatively, the communications manager 820 may support wireless communications in accordance with examples as disclosed herein. For example, the communications manager 820 is capable of, configured to, or operable to support a means for communicating control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication. The communications manager 820 is capable of, configured to, or operable to support a means for receiving, from a second UE, SCI that schedules a first sidelink shared channel communication from the second UE in a first communication resource in a time window of the first set of time windows. The communications manager 820 is capable of, configured to, or operable to support a means for receiving, from the second UE in the first communication resource in accordance with the SCI, the first sidelink shared channel communication via the receive beam. The communications manager 820 is capable of, configured to, or operable to support a means for transmitting, in a second communication resource that at least partially overlaps in time with the first communication resource and based on the SCI, a second sidelink shared channel communication via the transmit beam.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for more efficient utilization of communication resources.

FIG. 9 shows a block diagram 900 of a device 905 that supports time window based sidelink full-duplex in accordance with one or more aspects of the present disclosure. The device 905 may be an example of aspects of a device 805 or a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to time window based sidelink full-duplex). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to time window based sidelink full-duplex). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of time window based sidelink full-duplex as described herein. For example, the communications manager 920 may include a full-duplex time window manager 925, an SCI transmission manager 930, a sidelink shared channel transmission manager 935, a sidelink shared channel reception manager 940, an SCI reception manager 945, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The full-duplex time window manager 925 is capable of, configured to, or operable to support a means for communicating control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication. The SCI transmission manager 930 is capable of, configured to, or operable to support a means for transmitting SCI that schedules a first sidelink shared channel communication in a first communication resource in a time window of the first set of time windows. The sidelink shared channel transmission manager 935 is capable of, configured to, or operable to support a means for transmitting, in the first communication resource in accordance with the SCI, the first sidelink shared channel communication via the transmit beam. The sidelink shared channel reception manager 940 is capable of, configured to, or operable to support a means for receiving, in a second communication resource that at least partially overlaps in time with the first communication resource, a second sidelink shared channel communication via the receive beam.

Additionally, or alternatively, the communications manager 920 may support wireless communications in accordance with examples as disclosed herein. The full-duplex time window manager 925 is capable of, configured to, or operable to support a means for communicating control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication. The SCI reception manager 945 is capable of, configured to, or operable to support a means for receiving, from a second UE, SCI that schedules a first sidelink shared channel communication from the second UE in a first communication resource in a time window of the first set of time windows. The sidelink shared channel reception manager 940 is capable of, configured to, or operable to support a means for receiving, from the second UE in the first communication resource in accordance with the SCI, the first sidelink shared channel communication via the receive beam. The sidelink shared channel transmission manager 935 is capable of, configured to, or operable to support a means for transmitting, in a second communication resource that at least partially overlaps in time with the first communication resource and based on the SCI, a second sidelink shared channel communication via the transmit beam.

FIG. 10 shows a block diagram 1000 of a communications manager 1020 that supports time window based sidelink full-duplex in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of time window based sidelink full-duplex as described herein. For example, the communications manager 1020 may include a full-duplex time window manager 1025, an SCI transmission manager 1030, a sidelink shared channel transmission manager 1035, a sidelink shared channel reception manager 1040, an SCI reception manager 1045, a sidelink transmission parameter manager 1050, a sidelink resource manager 1055, a full-duplex BPL manager 1060, a half-duplex BPL manager

1065, or any combination thereof. Each of these components, or components or subcomponents thereof (e.g., one or more processors, one or more memories), may communicate, directly or indirectly, with one another (e.g., via one or more buses).

The communications manager 1020 may support wireless communications in accordance with examples as disclosed herein. The full-duplex time window manager 1025 is capable of, configured to, or operable to support a means for communicating control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication. The SCI transmission manager 1030 is capable of, configured to, or operable to support a means for transmitting SCI that schedules a first sidelink shared channel communication in a first communication resource in a time window of the first set of time windows. The sidelink shared channel transmission manager 1035 is capable of, configured to, or operable to support a means for transmitting, in the first communication resource in accordance with the SCI, the first sidelink shared channel communication via the transmit beam. The sidelink shared channel reception manager 1040 is capable of, configured to, or operable to support a means for receiving, in a second communication resource that at least partially overlaps in time with the first communication resource, a second sidelink shared channel communication via the receive beam.

In some examples, the first sidelink shared channel communication is transmitted to a second UE. In some examples, the second sidelink shared channel communication is received from the second UE.

In some examples, to support communicating the control signaling, the full-duplex BPL manager 1060 is capable of, configured to, or operable to support a means for communicating an indication of a first BPL for communications from the UE to the second UE and a second BPL for communications from the second UE to the UE, where the first BPL includes the transmit beam and the second BPL includes the receive beam.

In some examples, the half-duplex BPL manager 1065 is capable of, configured to, or operable to support a means for identifying a first set of BPLs that support half-duplex sidelink communication between the UE and the second UE. In some examples, the full-duplex BPL manager 1060 is capable of, configured to, or operable to support a means for transmitting, to the second UE, a first message indicating a second set of BPLs identified by the UE that can support the full-duplex sidelink communication between the UE and the second UE, where the second set of BPLs is identified based on the first set of BPLs. In some examples, the full-duplex BPL manager 1060 is capable of, configured to, or operable to support a means for receiving, from the second UE, a second message indicating a third set of BPLs identified by the second UE that can support the full-duplex sidelink communication between the UE and the second UE, where the first BPL and the second BPL are both included the second set of BPLs and the third set of BPLs.

In some examples, the second sidelink shared channel communication is received from a second UE. In some examples, the first sidelink shared channel communication is transmitted to a third UE.

In some examples, to support communicating the control signaling, the sidelink transmission parameter manager 1050 is capable of, configured to, or operable to support a means for communicating an indication of a set of transmission parameters associated with the full-duplex sidelink communication in the first set of time windows, the set of transmission parameters including at least one of a transmission power, a transmission timing, a MIMO scheme, a rank, a precoding matrix, or a target RSRP, where the first sidelink shared channel communication is transmitted in accordance with the set of transmission parameters.

In some examples, the SCI transmission manager 1030 is capable of, configured to, or operable to support a means for transmitting a second SCI that schedules a third sidelink shared channel communication in a third communication resource in a second time window of the first set of time windows, where the SCI indicates that the third sidelink shared channel communication is a half-duplex communication, and where the control signaling indicates a second set of transmission parameters associated with half-duplex sidelink communication in the first set of time windows. In some examples, the sidelink shared channel transmission manager 1035 is capable of, configured to, or operable to support a means for transmitting, in the third communication resource in accordance with the second set of transmission parameters, the third sidelink shared channel communication via the transmit beam.

In some examples, the SCI reception manager 1045 is capable of, configured to, or operable to support a means for receiving a second SCI that schedules the second sidelink shared channel communication, where the second SCI is responsive to the SCI.

In some examples, to support communicating the control signaling, the full-duplex time window manager 1025 is capable of, configured to, or operable to support a means for receiving the control signaling from a network entity.

In some examples, to support communicating the control signaling, the full-duplex time window manager 1025 is capable of, configured to, or operable to support a means for transmitting the control signaling to a second UE, where at least one of the first sidelink shared channel communication is transmitted to the second UE or the second sidelink shared channel communication is received from the second UE.

In some examples, to support communicating the control signaling, the full-duplex time window manager 1025 is capable of, configured to, or operable to support a means for receiving the control signaling from a second UE, where at least one of the first sidelink shared channel communication is transmitted to the second UE or the second sidelink shared channel communication is received from the second UE.

In some examples, the first communication resource at least partially overlaps in frequency with the second communication resource.

In some examples, the first communication resource includes a first set of frequency resources and the second communication resource includes a second set of frequency resources. In some examples, the first set of frequency resources is separated in frequency from the second set of frequency resources.

In some examples, the control signaling indicates the transmit beam at the UE via indicating a first TCI state. In some examples, the control signaling indicates the receive beam at the UE via indicating a second TCI state.

Additionally, or alternatively, the communications manager 1020 may support wireless communications in accordance with examples as disclosed herein. In some examples, the full-duplex time window manager 1025 is capable of, configured to, or operable to support a means for communicating control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication. The SCI reception manager 1045 is capable of, configured to, or operable to support a means for receiving, from a second UE, SCI that schedules a first sidelink shared channel communication from the second UE in a first communication resource in a time window of the first set of time windows. In some examples, the sidelink shared channel reception manager 1040 is capable of, configured to, or operable to support a means for receiving, from the second UE in the first communication resource in accordance with the SCI, the first sidelink shared channel communication via the receive beam. In some examples, the sidelink shared channel transmission manager 1035 is capable of, configured to, or operable to support a means for transmitting, in a second communication resource that at least partially overlaps in time with the first communication resource and based on the SCI, a second sidelink shared channel communication via the transmit beam.

In some examples, the second sidelink shared channel communication is transmitted to the second UE.

In some examples, to support communicating the control signaling, the full-duplex BPL manager 1060 is capable of, configured to, or operable to support a means for communicating an indication of a first BPL for communications from the second UE to the first UE and a second BPL for communications from the first UE to the second UE, where the first BPL includes the receive beam and the second BPL includes the transmit beam.

In some examples, the half-duplex BPL manager 1065 is capable of, configured to, or operable to support a means for identifying a first set of BPLs that support half-duplex sidelink communication between the second UE and the first UE. In some examples, the full-duplex BPL manager 1060 is capable of, configured to, or operable to support a means for receiving, from the second UE, a first message indicating a second set of BPLs identified by the second UE that can support the full-duplex sidelink communication between the second UE and the first UE. In some examples, the full-duplex BPL manager 1060 is capable of, configured to, or operable to support a means for transmitting, to the second UE, a second message indicating a third set of BPLs identified by the first UE that can support the full-duplex sidelink communication between the second UE and the first UE, where the third set of BPLs is identified based on the first set of BPLs, where the first BPL and the second BPL are both included the second set of BPLs and the third set of BPLs.

In some examples, the second sidelink shared channel communication is transmitted to a third UE.

In some examples, to support communicating the control signaling, the sidelink transmission parameter manager 1050 is capable of, configured to, or operable to support a means for communicating an indication of a set of transmission parameters associated with the full-duplex sidelink communication in the first set of time windows, the set of transmission parameters including at least one of a transmission power, a transmission timing, a MIMO scheme, a rank, a precoding matrix, or a target RSRP, where the first sidelink shared channel communication is received in accordance with the set of transmission parameters.

In some examples, the SCI reception manager 1045 is capable of, configured to, or operable to support a means for receiving, from the second UE, a second SCI that schedules a third sidelink shared channel communication in a third communication resource in a second time window of the first set of time windows, where the SCI indicates that the third sidelink shared channel communication is a half-duplex communication, and where the control signaling indicates a second set of transmission parameters associated with half-duplex sidelink communication in the first set of time windows. In some examples, the sidelink shared channel reception manager 1040 is capable of, configured to, or operable to support a means for receiving, from the second UE in the third communication resource in accordance with the second set of transmission parameters, the third sidelink shared channel communication via the receive beam.

In some examples, the SCI transmission manager 1030 is capable of, configured to, or operable to support a means for transmitting a second SCI that schedules the second sidelink shared channel communication, where the second SCI is responsive to the SCI.

In some examples, to support communicating the control signaling, the full-duplex time window manager 1025 is capable of, configured to, or operable to support a means for receiving the control signaling from a network entity.

In some examples, to support communicating the control signaling, the full-duplex time window manager 1025 is capable of, configured to, or operable to support a means for receiving the control signaling from one of the second UE or a third UE to which the second sidelink shared channel communication is transmitted.

In some examples, to support communicating the control signaling, the full-duplex time window manager 1025 is capable of, configured to, or operable to support a means for transmitting the control signaling to one of the second UE or a third UE to which the second sidelink shared channel communication is transmitted.

In some examples, the first communication resource at least partially overlaps in frequency with the second communication resource.

In some examples, the first communication resource includes a first set of frequency resources and the second communication resource includes a second set of frequency resources. In some examples, the first set of frequency resources is separated in frequency from the second set of frequency resources.

In some examples, the control signaling indicates the transmit beam at the first UE via indicating a first TCI state. In some examples, the control signaling indicates the receive beam at the first UE via indicating a second TCI state.

In some examples, the sidelink resource manager 1055 is capable of, configured to, or operable to support a means for monitoring sidelink resources for the first sidelink shared channel communication based on the SCI. In some examples, the sidelink resource manager 1055 is capable of, configured to, or operable to support a means for selecting, based on the monitoring, the second communication resource for transmission of the second sidelink shared channel communication from a set of configured sidelink communication resources.

In some examples, the second communication resource is selected randomly from the set of configured sidelink communication resources.

FIG. 11 shows a diagram of a system 1100 including a device 1105 that supports time window based sidelink full-duplex in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, computer-executable code 1135 including instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may contain, among other things, a basic I/O system (BIOS) which may control basic hardware or software operation such as the interaction with peripheral components or devices.

The at least one processor 1140 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting time window based sidelink full-duplex). For example, the device 1105 or a component of the device 1105 may include at least one processor 1140 and at least one memory 1130 coupled with or to the at least one processor 1140, the at least one processor 1140 and at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions herein. In some examples, the at least one processor 1140 may be a component of a processing system, which may refer to a system (such as a series) of machines, circuitry (including, for example, one or both of processor circuitry (which may include the at least one processor 1140) and memory circuitry (which may include the at least one memory 1130)), or components, that receives or obtains inputs and processes the inputs to produce, generate, or obtain a set of outputs. The processing system may be configured to perform one or more of the functions described herein. As such, the at least one processor 1140 or a processing system including the at least one processor 1140 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1130 or otherwise, to perform one or more of the functions described herein.

The communications manager 1120 may support wireless communications in accordance with examples as disclosed herein. For example, the communications manager 1120 is capable of, configured to, or operable to support a means for communicating control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication. The communications manager 1120 is capable of, configured to, or operable to support a means for transmitting SCI that schedules a first sidelink shared channel communication in a first communication resource in a time window of the first set of time windows. The communications manager 1120 is capable of, configured to, or operable to support a means for transmitting, in the first communication resource in accordance with the SCI, the first sidelink shared channel communication via the transmit beam. The communications manager 1120 is capable of, configured to, or operable to support a means for receiving, in a second communication resource that at least partially overlaps in time with the first communication resource, a second sidelink shared channel communication via the receive beam.

Additionally, or alternatively, the communications manager 1120 may support wireless communications in accordance with examples as disclosed herein. For example, the communications manager 1120 is capable of, configured to, or operable to support a means for communicating control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication. The communications manager 1120 is capable of, configured to, or operable to support a means for receiving, from a second UE, SCI that schedules a first sidelink shared channel communication from the second UE in a first communication resource in a time window of the first set of time windows. The communications manager 1120 is capable of, configured to, or operable to support a means for receiving, from the second UE in the first communication resource in accordance with the SCI, the first sidelink shared channel communication via the receive beam. The communications manager 1120 is capable of, configured to, or operable to support a means for transmitting, in a second communication resource that at least partially overlaps in time with the first communication resource and based on the SCI, a second sidelink shared channel communication via the transmit beam.

By including or configuring the communications manager 1120 in accordance with examples as described herein, the device 1105 may support techniques for reduced latency, more efficient utilization of communication resources, and improved coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of time window based sidelink full-duplex as described herein, or the at least one processor 1140 and the at least one memory 1130 may be otherwise configured to, individually or collectively, perform or support such operations.

FIG. 12 shows a flowchart illustrating a method 1200 that supports time window based sidelink full-duplex in accordance with aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1205, the method may include communicating control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication. The operations of block 1205 may be performed in accordance with examples as disclosed herein. In some examples, aspects of the operations of 1205 may be performed by a full-duplex time window manager 1025 as described with reference to FIG. 10.

At 1210, the method may include transmitting SCI that schedules a first sidelink shared channel communication in a first communication resource in a time window of the first set of time windows. The operations of block 1210 may be performed in accordance with examples as disclosed herein. In some examples, aspects of the operations of 1210 may be performed by an SCI transmission manager 1030 as described with reference to FIG. 10.

At 1215, the method may include transmitting, in the first communication resource in accordance with the SCI, the first sidelink shared channel communication via the transmit beam. The operations of block 1215 may be performed in accordance with examples as disclosed herein. In some examples, aspects of the operations of 1215 may be performed by a sidelink shared channel transmission manager 1035 as described with reference to FIG. 10.

At 1220, the method may include receiving, in a second communication resource that at least partially overlaps in time with the first communication resource, a second sidelink shared channel communication via the receive beam. The operations of block 1220 may be performed in accordance with examples as disclosed herein. In some examples, aspects of the operations of 1220 may be performed by a sidelink shared channel reception manager 1040 as described with reference to FIG. 10.

FIG. 13 shows a flowchart illustrating a method 1300 that supports time window based sidelink full-duplex in accordance with aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1305, the method may include communicating control signaling indicating a first set of time windows associated with full-duplex sidelink communication and a second set of time windows associated with half-duplex sidelink communications, where the control signaling indicates a transmit beam at the UE and a receive beam at the UE for the full-duplex sidelink communication. The operations of block 1305 may be performed in accordance with examples as disclosed herein. In some examples, aspects of the operations of 1305 may be performed by a full-duplex time window manager 1025 as described with reference to FIG. 10.

At 1310, the method may include receiving, from a second UE, SCI that schedules a first sidelink shared channel communication from the second UE in a first communication resource in a time window of the first set of time windows. The operations of block 1310 may be performed in accordance with examples as disclosed herein. In some examples, aspects of the operations of 1310 may be performed by an SCI reception manager 1045 as described with reference to FIG. 10.

At 1315, the method may include receiving, from the second UE in the first communication resource in accordance with the SCI, the first sidelink shared channel communication via the receive beam. The operations of block 1315 may be performed in accordance with examples as disclosed herein. In some examples, aspects of the operations of 1315 may be performed by a sidelink shared channel reception manager 1040 as described with reference to FIG. 10.

At 1320, the method may include transmitting, in a second communication resource that at least partially overlaps in time with the first communication resource and based at least in part on the SCI, a second sidelink shared channel communication via the transmit beam. The operations of block 1320 may be performed in accordance with examples as disclosed herein. In some examples, aspects of the operations of 1320 may be performed by a sidelink shared channel transmission manager 1035 as described with reference to FIG. 10.

The following provides an overview of aspects of the present disclosure:

Aspect 1: A method for wireless communications at a UE, comprising: communicating control signaling indicating a first set of time windows associated with full-duplex sidelink communication and a second set of time windows associated with half-duplex sidelink communications, wherein the control signaling indicates a transmit beam at the UE and a receive beam at the UE for the full-duplex sidelink communication; transmitting SCI that schedules a first sidelink shared channel communication in a first communication resource in a time window of the first set of time windows; transmitting, in the first communication resource in accordance with the SCI, the first sidelink shared channel communication via the transmit beam; and receiving, in a second communication resource that at least partially overlaps in time with the first communication resource, a second sidelink shared channel communication via the receive beam.

Aspect 2: The method of aspect 1, wherein the first sidelink shared channel communication is transmitted to a second UE, and the second sidelink shared channel communication is received from the second UE.

Aspect 3: The method of aspect 2, wherein communicating the control signaling comprises: communicating an indication of a first BPL for communications from the UE to the second UE and a second BPL for communications from the second UE to the UE, wherein the first BPL comprises the transmit beam and the second BPL comprises the receive beam.

Aspect 4: The method of aspect 3, further comprising: identifying a first set of BPLs that support half-duplex sidelink communication between the UE and the second UE; transmitting, to the second UE, a first message indicating a second set of BPLs identified by the UE that can support the full-duplex sidelink communication between the UE and the second UE, wherein the second set of BPLs is identified based on the first set of BPLs; and receiving, from the second UE, a second message indicating a third set of BPLs identified by the second UE that can support the full-duplex sidelink communication between the UE and the second UE, wherein the first BPL and the second BPL are both included the second set of BPLs and the third set of BPLs.

Aspect 5: The method of aspect 1, wherein the second sidelink shared channel communication is received from a second UE, and the first sidelink shared channel communication is transmitted to a third UE.

Aspect 6: The method of any of aspects 1 through 5, wherein communicating the control signaling comprises: communicating an indication of a set of transmission parameters associated with the full-duplex sidelink communication in the first set of time windows, the set of transmission parameters comprising at least one of a transmission power, a transmission timing, a MCS, a rank, a precoding matrix, or a target RSRP, wherein the first sidelink shared channel communication is transmitted in accordance with the set of transmission parameters.

Aspect 7: The method of aspect 6, further comprising: transmitting a second SCI that schedules a third sidelink shared channel communication in a third communication resource in a second time window of the first set of time windows, wherein the SCI indicates that the third sidelink shared channel communication is a half-duplex communication, and wherein the control signaling indicates a second set of transmission parameters associated with half-duplex sidelink communication in the first set of time windows; and transmitting, in the third communication resource in accordance with the second set of transmission parameters, the third sidelink shared channel communication via the transmit beam.

Aspect 8: The method of any of aspects 1 through 7, further comprising: receiving a second SCI that schedules the second sidelink shared channel communication, wherein the second SCI is responsive to the SCI.

Aspect 9: The method of any of aspects 1 through 8, wherein communicating the control signaling comprises: receiving the control signaling from a network entity.

Aspect 10: The method of any of aspects 1 through 8, wherein communicating the control signaling comprises: transmitting the control signaling to a second UE, wherein at least one of the first sidelink shared channel communication is transmitted to the second UE or the second sidelink shared channel communication is received from the second UE.

Aspect 11: The method of any of aspects 1 through 8, wherein communicating the control signaling comprises: receiving the control signaling from a second UE, wherein at least one of the first sidelink shared channel communication is transmitted to the second UE or the second sidelink shared channel communication is received from the second UE.

Aspect 12: The method of any of aspects 1 through 11, wherein the first communication resource at least partially overlaps in frequency with the second communication resource.

Aspect 13: The method of any of aspects 1 through 11, wherein the first communication resource comprises a first set of frequency resources and the second communication resource comprises a second set of frequency resources, and the first set of frequency resources is separated in frequency from the second set of frequency resources.

Aspect 14: The method of any of aspects 1 through 13, wherein the control signaling indicates the transmit beam at the UE via indicating a first TCI state, and the control signaling indicates the receive beam at the UE via indicating a second TCI state.

Aspect 15: A method for wireless communications at a first UE, comprising: communicating control signaling indicating a first set of time windows associated with full-duplex sidelink communication and a second set of time windows associated with half-duplex sidelink communications, wherein the control signaling indicates a transmit beam at the UE and a receive beam at the UE for the full-duplex sidelink communication;

receiving, from a second UE, SCI that schedules a first sidelink shared channel communication from the second UE in a first communication resource in a time window of the first set of time windows; receiving, from the second UE in the first communication resource in accordance with the SCI, the first sidelink shared channel communication via the receive beam; and transmitting, in a second communication resource that at least partially overlaps in time with the first communication resource and based at least in part on the SCI, a second sidelink shared channel communication via the transmit beam.

Aspect 16: The method of aspect 15, wherein the second sidelink shared channel communication is transmitted to the second UE.

Aspect 17: The method of aspect 16, wherein communicating the control signaling comprises: communicating an indication of a first BPL for communications from the second UE to the first UE and a second BPL for communications from the first UE to the second UE, wherein the first BPL comprises the receive beam and the second BPL comprises the transmit beam.

Aspect 18: The method of aspect 17, further comprising: identifying a first set of BPLs that support half-duplex sidelink communication between the second UE and the first UE; receiving, from the second UE, a first message indicating a second set of BPLs identified by the second UE that can support the full-duplex sidelink communication between the second UE and the first UE; and transmitting, to the second UE, a second message indicating a third set of BPLs identified by the first UE that can support the full-duplex sidelink communication between the second UE and the first UE, wherein the third set of BPLs is identified based on the first set of BPLs, wherein the first BPL and the second BPL are both included the second set of BPLs and the third set of BPLs.

Aspect 19: The method of aspect 15, wherein the second sidelink shared channel communication is transmitted to a third UE.

Aspect 20: The method of any of aspects 15 through 19, wherein communicating the control signaling comprises: communicating an indication of a set of transmission parameters associated with the full-duplex sidelink communication in the first set of time windows, the set of transmission parameters comprising at least one of a transmission power, a transmission timing, a MCS, a rank, a precoding matrix, or a target RSRP, wherein the first sidelink shared channel communication is received in accordance with the set of transmission parameters.

Aspect 21: The method of aspect 20, further comprising: receiving, from the second UE, a second SCI that schedules a third sidelink shared channel communication in a third communication resource in a second time window of the first set of time windows, wherein the SCI indicates that the third sidelink shared channel communication is a half-duplex communication, and wherein the control signaling indicates a second set of transmission parameters associated with half-duplex sidelink communication in the first set of time windows; and receiving, from the second UE in the third communication resource in accordance with the second set of transmission parameters, the third sidelink shared channel communication via the receive beam.

Aspect 22: The method of any of aspects 15 through 21, further comprising: transmitting a second SCI that schedules the second sidelink shared channel communication, wherein the second SCI is responsive to the SCI.

Aspect 23: The method of any of aspects 15 through 22, wherein communicating the control signaling comprises: receiving the control signaling from a network entity.

Aspect 24: The method of any of aspects 15 through 22, wherein communicating the control signaling comprises: receiving the control signaling from one of the second UE or a third UE to which the second sidelink shared channel communication is transmitted.

Aspect 25: The method of any of aspects 15 through 22, wherein communicating the control signaling comprises: transmitting the control signaling to one of the second UE or a third UE to which the second sidelink shared channel communication is transmitted.

Aspect 26: The method of any of aspects 15 through 25, wherein the first communication resource at least partially overlaps in frequency with the second communication resource.

Aspect 27: The method of any of aspects 15 through 25, wherein the first communication resource comprises a first set of frequency resources and the second communication resource comprises a second set of frequency resources, and the first set of frequency resources is separated in frequency from the second set of frequency resources.

Aspect 28: The method of any of aspects 15 through 27, wherein the control signaling indicates the transmit beam at the first UE via indicating a first TCI state, and the control signaling indicates the receive beam at the first UE via indicating a second TCI state.

Aspect 29: The method of any of aspects 15 through 28, further comprising: monitoring sidelink resources for the first sidelink shared channel communication based at least in part on the SCI; and selecting, based at least in part on the monitoring, the second communication resource for transmission of the second sidelink shared channel communication from a set of configured sidelink communication resources.

Aspect 30: The method of aspect 29, wherein the second communication resource is selected randomly from the set of configured sidelink communication resources.

Aspect 31: A UE for wireless communications, comprising one or more memories storing processor-executable code, and one or more processors coupled with the one or more memories and individually or collectively operable to execute the code (e.g., directly, indirectly, after pre-processing, without pre-processing) to cause the UE to perform a method of any of aspects 1 through 14.

Aspect 32: A UE for wireless communications, comprising at least one means for performing a method of any of aspects 1 through 14.

Aspect 33: A non-transitory computer-readable medium storing code for wireless communication, the code comprising instructions executable by at least one processor (e.g., directly, indirectly, after pre-processing, without pre-processing) to perform a method of any of aspects 1 through 14.

Aspect 34: A first UE for wireless communications, comprising one or more memories storing processor-executable code, and one or more processors coupled with the one or more memories and individually or collectively operable to execute the code (e.g., directly, indirectly, after pre-processing, without pre-process-ing) to cause the first UE to perform a method of any of aspects 15 through 30.

Aspect 35: A first UE for wireless communications, comprising at least one means for performing a method of any of aspects 15 through 30.

Aspect 36: A non-transitory computer-readable medium storing code for wireless communication, the code comprising instructions executable by at least one processor (e.g., directly, indirectly, after pre-process-ing, without pre-processing) to perform a method of any of aspects 15 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR net-works. For example, the described techniques may be appli-cable to various other wireless communications systems such as Ultra Mobile Broadband (UMB), Institute of Elec-trical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly men-tioned herein.

Information and signals described herein may be repre-sented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be imple-mented or performed using a general-purpose processor, a DSP, an ASIC, a CPU, a GPU, an FPGA or other program-mable logic device, discrete gate or transistor logic, discrete hardware components, or any combination thereof designed to perform the functions described herein. A general-purpose processor may be a microprocessor but, in the alternative, the processor may be any processor, controller, microcon-troller, or state machine. A processor may also be imple-mented as a combination of computing devices (e.g., a combination of a DSP and a microprocessor, multiple micro-processors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. Software shall be construed broadly to mean instructions, instruction sets, code, code segments, program code, programs, subprograms, software modules, applications, software applications, software packages, rou-tines, subroutines, objects, executables, threads of execu-tion, procedures, or functions, whether referred to as soft-ware, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using soft-ware executed by a processor, hardware, hardwiring, or combinations of any of these. Features implementing func-tions may also be physically located at various positions, including being distributed such that portions of functions are implemented at different physical locations.

Computer-readable media includes both non-transitory computer storage media and communication media includ-ing any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, elec-trically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a com-puter-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the defi-nition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by mul-tiple memories that, individually or collectively, are capable of performing the described functions or operations.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
communicate control signaling indicating a first plurality of time windows associated with full-duplex sidelink communication and a second plurality of time windows associated with half-duplex sidelink communications, wherein the control signaling indicates a transmit beam at the UE and a receive beam at the UE that are configured for the full-duplex sidelink communication during the first plurality of time windows;
transmit sidelink control information that schedules a first sidelink shared channel communication in a first communication resource in a time window of the first plurality of time windows;
transmit, in the first communication resource in accordance with the sidelink control information, the first sidelink shared channel communication via the transmit beam; and
receive, in a second communication resource that at least partially overlaps in time with the first communication resource, a second sidelink shared channel communication via the receive beam.

2. The UE of claim 1, wherein:
the first sidelink shared channel communication is transmitted to a second UE, and
the second sidelink shared channel communication is received from the second UE.

3. The UE of claim 2, wherein, to communicate the control signaling, the one or more processors are individually or collectively operable to execute the code to cause the UE to:
communicate an indication of a first beam pair link for communications from the UE to the second UE and a second beam pair link for communications from the second UE to the UE, wherein the first beam pair link comprises the transmit beam and the second beam pair link comprises the receive beam.

4. The UE of claim 3, wherein the one or more processors are individually or collectively further operable to execute the code to cause the UE to:
identify a first set of beam pair links that support half-duplex sidelink communication between the UE and the second UE;
transmit, to the second UE, a first message indicating a second set of beam pair links identified by the UE that can support the full-duplex sidelink communication between the UE and the second UE, wherein the second set of beam pair links is identified based on the first set of beam pair links; and
receive, from the second UE, a second message indicating a third set of beam pair links identified by the second UE that can support the full-duplex sidelink communication between the UE and the second UE, wherein the first beam pair link and the second beam pair link are both included the second set of beam pair links and the third set of beam pair links.

5. The UE of claim 1, wherein:

the second sidelink shared channel communication is received from a second UE, and the first sidelink shared channel communication is transmitted to a third UE.

6. The UE of claim 1, wherein, to communicate the control signaling, the one or more processors are individually or collectively operable to execute the code to cause the UE to:

communicate an indication of a set of transmission parameters associated with the full-duplex sidelink communication in the first plurality of time windows, the set of transmission parameters comprising at least one of a transmission power, a transmission timing, a modulation and coding scheme, a rank, a precoding matrix, or a target reference signal receive power, wherein the first sidelink shared channel communication is transmitted in accordance with the set of transmission parameters.

7. The UE of claim 6, wherein the one or more processors are individually or collectively further operable to execute the code to cause a second UE to:

transmit a second sidelink control information that schedules a third sidelink shared channel communication in a third communication resource in a second time window of the first plurality of time windows, wherein the sidelink control information indicates that the third sidelink shared channel communication is a half-duplex communication, and wherein the control signaling indicates a second set of transmission parameters associated with half-duplex sidelink communication in the first plurality of time windows; and transmit, in the third communication resource in accordance with the second set of transmission parameters, the third sidelink shared channel communication via the transmit beam.

8. The UE of claim 1, wherein the one or more processors are individually or collectively further operable to execute the code to cause the UE to:

receive a second sidelink control information that schedules the second sidelink shared channel communication, wherein the second sidelink control information is responsive to the sidelink control information.

9. The UE of claim 1, wherein, to communicate the control signaling, the one or more processors are individually or collectively operable to execute the code to cause the UE to:

receive the control signaling from a network entity.

10. The UE of claim 1, wherein, to communicate the control signaling, the one or more processors are individually or collectively operable to execute the code to cause the UE to:

transmit the control signaling to a second UE, wherein at least one of the first sidelink shared channel communication is transmitted to the second UE or the second sidelink shared channel communication is received from the second UE.

11. The UE of claim 1, wherein, to communicate the control signaling, the one or more processors are individually or collectively operable to execute the code to cause the UE to:

receive the control signaling from a second UE, wherein at least one of the first sidelink shared channel communication is transmitted to the second UE or the second sidelink shared channel communication is received from the second UE.

12. The UE of claim 1, wherein the first communication resource at least partially overlaps in frequency with the second communication resource.

13. The UE of claim 1, wherein:

the first communication resource comprises a first set of frequency resources and the second communication resource comprises a second set of frequency resources, and the first set of frequency resources is separated in frequency from the second set of frequency resources.

14. The UE of claim 1, wherein:

the control signaling indicates the transmit beam at the UE via indicating a first transmission configuration indicator state, and the control signaling indicates the receive beam at the UE via indicating a second transmission configuration indicator state.

15. The first UE of claim 1, wherein:

the first plurality of time windows comprise first periodic and discontinuous durations, and the second plurality of time windows comprise second periodic and discontinuous durations.

16. A first user equipment (UE), comprising:

one or more memories storing processor-executable code; and one or more processors coupled with the one or more memories and individually or collectively operable to execute the code to cause the first UE to:

communicate control signaling indicating a first plurality of time windows associated with full-duplex sidelink communication and a second plurality of time windows associated with half-duplex sidelink communications, wherein the control signaling indicates a transmit beam at the first UE and a receive beam at the first UE are configured for the full-duplex sidelink communication during the first plurality of time windows;

receive, from a second UE, sidelink control information that schedules a first sidelink shared channel communication from the second UE in a first communication resource in a time window of the first plurality of time windows;

receive, from the second UE in the first communication resource in accordance with the sidelink control information, the first sidelink shared channel communication via the receive beam; and transmit, in a second communication resource that at least partially overlaps in time with the first communication resource and based at least in part on the sidelink control information, a second sidelink shared channel communication via the transmit beam.

17. The first UE of claim 16, wherein the second sidelink shared channel communication is transmitted to the second UE.

18. The first UE of claim 17, wherein, to communicate the control signaling, the one or more processors are individually or collectively operable to execute the code to cause the first UE to:

communicate an indication of a first beam pair link for communications from the second UE to the first UE and a second beam pair link for communications from the first UE to the second UE, wherein the first beam pair link comprises the receive beam and the second beam pair link comprises the transmit beam.

19. The first UE of claim 18, wherein the one or more processors are individually or collectively further operable to execute the code to cause the first UE to:

identify a first set of beam pair links that support half-duplex sidelink communication between the second UE and the first UE;

receive, from the second UE, a first message indicating a second set of beam pair links identified by the second UE that can support the full-duplex sidelink communication between the second UE and the first UE; and transmit, to the second UE, a second message indicating a third set of beam pair links identified by the first UE that can support the full-duplex sidelink communication between the second UE and the first UE, wherein the third set of beam pair links is identified based on the first set of beam pair links, wherein the first beam pair link and the second beam pair link are both included the second set of beam pair links and the third set of beam pair links.

20. The first UE of claim 16, wherein the second sidelink shared channel communication is transmitted to a third UE.

21. The first UE of claim 16, wherein, to communicate the control signaling, the one or more processors are individually or collectively operable to execute the code to cause the first UE to:

communicate an indication of a set of transmission parameters associated with the full-duplex sidelink communication in the first plurality of time windows, the set of transmission parameters comprising at least one of a transmission power, a transmission timing, a modulation and coding scheme, a rank, a precoding matrix, or a target reference signal receive power, wherein the first sidelink shared channel communication is received in accordance with the set of transmission parameters.

22. The first UE of claim 21, wherein the one or more processors are individually or collectively further operable to execute the code to cause the first UE to:

receive, from the second UE, a second sidelink control information that schedules a third sidelink shared channel communication in a third communication resource in a second time window of the first plurality of time windows, wherein the sidelink control information indicates that the third sidelink shared channel communication is a half-duplex communication, and wherein the control signaling indicates a second set of transmission parameters associated with half-duplex sidelink communication in the first plurality of time windows; and receive, from the second UE in the third communication resource in accordance with the second set of transmission parameters, the third sidelink shared channel communication via the receive beam.

23. The first UE of claim 16, wherein the one or more processors are individually or collectively further operable to execute the code to cause the first UE to:

transmit a second sidelink control information that schedules the second sidelink shared channel communication, wherein the second sidelink control information is responsive to the sidelink control information.

24. The first UE of claim 16, wherein, to communicate the control signaling, the one or more processors are individually or collectively operable to execute the code to cause the first UE to:

receive the control signaling from a network entity.

25. The first UE of claim 16, wherein, to communicate the control signaling, the one or more processors are individually or collectively operable to execute the code to cause the first UE to:

receive the control signaling from one of the second UE or a third UE to which the second sidelink shared channel communication is transmitted.

26. The first UE of claim 16, wherein, to communicate the control signaling, the one or more processors are individually or collectively operable to execute the code to cause the first UE to:

transmit the control signaling to one of the second UE or a third UE to which the second sidelink shared channel communication is transmitted.

27. The first UE of claim 16, wherein:

the control signaling indicates the transmit beam at the first UE via indicating a first transmission configuration indicator state, and the control signaling indicates the receive beam at the first UE via indicating a second transmission configuration indicator state.

28. The first UE of claim 16, wherein the one or more processors are individually or collectively further operable to execute the code to cause the first UE to:

monitor sidelink resources for the first sidelink shared channel communication based at least in part on the sidelink control information; and select, based at least in part on the monitoring, the second communication resource for transmission of the second sidelink shared channel communication from a set of configured sidelink communication resources.

29. A method for wireless communications at a user equipment (UE), comprising:

communicating control signaling indicating a first plurality of time windows associated with full-duplex sidelink communication and a second plurality of time windows associated with half-duplex sidelink communications, wherein the control signaling indicates a transmit beam at the UE and a receive beam at the UE are configured for the full-duplex sidelink communication during the first plurality of time windows;

transmitting sidelink control information that schedules a first sidelink shared channel communication in a first communication resource in a time window of the first plurality of time windows;

transmitting, in the first communication resource in accordance with the sidelink control information, the first sidelink shared channel communication via the transmit beam; and receiving, in a second communication resource that at least partially overlaps in time with the first communication resource, a second sidelink shared channel communication via the receive beam.

30. A method for wireless communications at a first user equipment (UE), comprising:

communicating control signaling indicating a first plurality of time windows associated with full-duplex sidelink communication and a second plurality of time windows associated with half-duplex sidelink communications, wherein the control signaling indicates a transmit beam at the first UE and a receive beam at the first UE are configured for the full-duplex sidelink communication during the first plurality of time windows;

receiving, from a second UE, sidelink control information that schedules a first sidelink shared channel communication from the second UE in a first communication resource in a time window of the first plurality of time windows;

receiving, from the second UE in the first communication resource in accordance with the sidelink control information, the first sidelink shared channel communication via the receive beam; and transmitting, in a second communication resource that at least partially overlaps in time with the first communication resource and based at least in part on the sidelink control information, a second sidelink shared channel communication via the transmit beam.

\* \* \* \* \*